(12) United States Patent
Kanai et al.

(10) Patent No.: US 9,552,307 B2
(45) Date of Patent: *Jan. 24, 2017

(54) INFORMATION PROCESSING APPARATUS AND COMPUTER PROGRAM PRODUCT

(71) Applicant: Kabushiki Kaisha Toshiba, Minato-ku (JP)

(72) Inventors: Jun Kanai, Inagi (JP); Hiroshi Isozaki, Kawasaki (JP); Toshiki Kizu, Yokohama (JP); Shunsuke Sasaki, Shinjuku (JP); Shintarou Sano, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 32 days.

This patent is subject to a terminal disclaimer.

(21) Appl. No.: 14/482,297

(22) Filed: Sep. 10, 2014

(65) Prior Publication Data
US 2015/0089246 A1 Mar. 26, 2015

(30) Foreign Application Priority Data
Sep. 20, 2013 (JP) .................................. 2013-196110

(51) Int. Cl.
G06F 12/14 (2006.01)
(52) U.S. Cl.
CPC ..... G06F 12/1491 (2013.01); G06F 2211/007 (2013.01)
(58) Field of Classification Search
None
See application file for complete search history.

(56) References Cited

U.S. PATENT DOCUMENTS

| 7,237,081 B2 * | 6/2007 | Dahan | G06F 9/30047 711/163 |
| 7,305,534 B2 | 12/2007 | Watt et al. | |
| 7,380,275 B2 * | 5/2008 | Srinivasan | G06F 21/10 705/51 |

(Continued)

FOREIGN PATENT DOCUMENTS

| JP | 2006-506754 A | 2/2006 |
| JP | 2008-52713 A | 3/2008 |

(Continued)

*Primary Examiner* — Farid Homayounmehr
*Assistant Examiner* — Olanrewaju Bucknor
(74) *Attorney, Agent, or Firm* — Oblon, McClelland, Maier & Neustadt, L.L.P.

(57) ABSTRACT

According to an embodiment, an information processing apparatus includes a secure OS, a non-secure OS, and a monitor. The monitor is configured to switch between the OSs. The secure OS includes a memory protection setting controller, a processing determination controller, and a secure device access controller. The memory protection setting controller is configured to set a protection address in a memory for each certain processing. The processing determination controller is configured to receive an access type, a physical address of an access destination, and data to be written, acquire a list of processing, and determine a type of processing to be performed. The secure device access controller is configured to receive the access type, the physical address of an access destination, and data to be written, and access a peripheral identified by the physical address.

7 Claims, 23 Drawing Sheets

(56) References Cited

U.S. PATENT DOCUMENTS

| | | | | |
|---|---|---|---|---|
| 7,457,960 | B2* | 11/2008 | Kablotsky | G06F 21/74 713/176 |
| 7,529,861 | B2 | 5/2009 | Ohta et al. | |
| 7,788,433 | B2* | 8/2010 | Henry | G06F 21/72 710/261 |
| 7,849,310 | B2* | 12/2010 | Watt | G06F 9/3012 713/150 |
| 8,051,467 | B2* | 11/2011 | Renno | G06F 12/1433 726/27 |
| 8,473,754 | B2* | 6/2013 | Jones | G06F 21/53 380/277 |
| 8,739,177 | B2 | 5/2014 | Qian et al. | |
| 2007/0180509 | A1* | 8/2007 | Swartz | G06F 9/4406 726/9 |
| 2007/0204085 | A1* | 8/2007 | Orlando | G06F 21/74 710/261 |
| 2008/0098239 | A1* | 4/2008 | Wada | G11B 20/00086 713/193 |
| 2008/0177905 | A1* | 7/2008 | Ohta | G06F 13/126 710/14 |
| 2008/0244229 | A1* | 10/2008 | Yao | G06F 9/3836 712/205 |
| 2011/0044451 | A1* | 2/2011 | Anzai | G06F 21/51 380/45 |
| 2012/0331464 | A1* | 12/2012 | Saito | G06F 9/5077 718/1 |
| 2013/0166848 | A1* | 6/2013 | Miyazaki | G06F 12/0804 711/143 |
| 2013/0219408 | A1* | 8/2013 | Haruki | G06F 9/461 718/108 |
| 2015/0082053 | A1 | 3/2015 | Sano et al. | |
| 2015/0089213 | A1 | 3/2015 | Isozaki et al. | |

FOREIGN PATENT DOCUMENTS

| | | |
|---|---|---|
| JP | 2012-3747 A | 1/2012 |
| JP | 2015-60249 A | 3/2015 |
| JP | 2015-64677 A | 4/2015 |

* cited by examiner

NON-SECURE OS PAGE TABLE ADDRESS REGISTER

0x20000000

NON-SECURE OS PAGE TABLE
(DISPOSED AT ADDRESS = 0x20000000)

| VIRTUAL ADDRESS | PHYSICAL ADDRESS |
|---|---|
| 0x00000000 | 0x00000000 |
| 0x00001000 | 0xF0001000 |
| 0x00002000 | 0x10000000 |
| ... | ... |
| 0xFFFFF000 | 0x10001000 |

| STARTING PHYSICAL ADDRESS | SIZE | DIRECTION | TYPE OF PROCESSING |
|---|---|---|---|
| 0x10000000 | 16 | READ AND WRITE | RECORDING |
| 0x10000010 | 1024 | WRITE | ENCRYPTION |
| 0x10000010 | 1024 | READ | DECRYPTION |
| 0x10001000 | 16 | WRITE | DISCARDING |
| 0x10002000 | 16 | WRITE | CONVERSION |

FIG.6

| NON-SECURE OS | r0=0, r1=0.....r12=0, svc_r13=0, svc_r14=0, irq_r13=0, irq_r14=0.... |
|---|---|
| SECURE OS | r0=0, r1=0.....r12=0, svc_r13=0, svc_r14=0, irq_r13=0, irq_r14=0.... |

FIG.15

| TYPE OF INTERRUPT | TYPE OF FILTERING |
|---|---|
| DISK READ COMPLETION INTERRUPT | RECORDING |
| TIMER INTERRUPT | DISCARDING |
| NETWORK PACKET ARRIVAL INTERRUPT | CONVERSION |

| STARTING PHYSICAL ADDRESS | SIZE | DIRECTION | TYPE OF PROCESSING |
|---|---|---|---|
| 0x10000000 | 4096 | WRITE | ENCRYPTION AND ENCAPSULATION |
| 0x10001000 | 4096 | READ | DECRYPTION AND DECAPSULATION |

| STARTING PHYSICAL ADDRESS | SIZE | DIRECTION | TYPE OF PROCESSING |
|---|---|---|---|
| 0x10010000 | 32 | WRITE | ENCRYPTION OR DECRYPTION |

| STARTING PHYSICAL ADDRESS | SIZE | DIRECTION | TYPE OF PROCESSING |
|---|---|---|---|
| 0x10010000 | 32 | WRITE | CONVERT ACCESS INTO ACCESS TO NETWORK |

INFORMATION PROCESSING APPARATUS AND COMPUTER PROGRAM PRODUCT

CROSS-REFERENCE TO RELATED APPLICATION

This application is based upon and claims the benefit of priority from Japanese Patent Application No. 2013-196110, filed on Sep. 20, 2013; the entire contents of which are incorporated herein by reference.

FIELD

Embodiments described herein relate generally to an information processing apparatus and a computer program product.

BACKGROUND

Virtualization techniques in which a plurality of operating systems (OSs) are concurrently run on a single computer have been widely used from servers to embedded devices. The use of the virtualization techniques makes it possible to monitor access to peripherals.

ARM TrustZone (registered trademark) has a memory protection function. In an ARM processor, buffers and registers of the peripherals are mapped in a memory space. The access to the peripherals thus can be monitored. The ARM TrustZone, however, has no clear functional structure to securely filter the access to the peripherals. The virtualization of peripherals needs a structure to perform conversion of contents of the access to the peripherals by filtering the access such as encryption.

BRIEF DESCRIPTION OF THE DRAWINGS

FIG. 6 is a schematic diagram illustrating contexts of the non-secure OS and a secure-OS;

FIG. 15 is a schematic diagram illustrating an interrupt processing table in the second embodiment;

DETAILED DESCRIPTION

Figure 1:
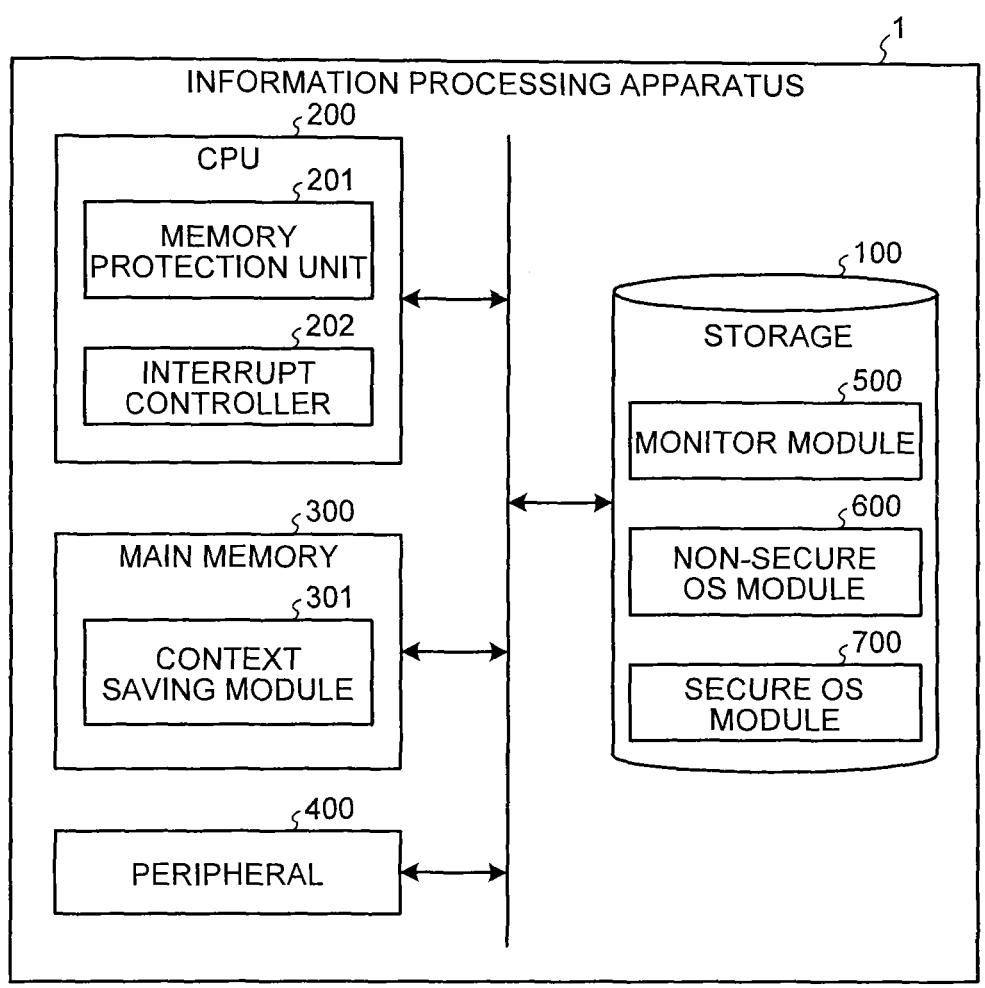
FIG. 1 is a block diagram illustrating a hardware structure of an information processing apparatus according to a first embodiment.

According to an embodiment, an information processing apparatus includes a processor, a secure operating system (OS), a non-secure OS, and a monitor. The processor is configured to be selectively switched between a secure mode and in a non-secure mode, set independent access rights for the respective modes to a memory, and perform certain data processing in the selected mode. The secure OS is configured to run in the secure mode. The non-secure OS is configured to run in the non-secure mode. The monitor is configured to switch between the secure OS and the non-secure OS. The secure OS includes a processing table management controller, a memory protection setting controller, a processing determination controller, a processing executing controller, the secure device access controller, and an entry controller. The processing table management controller is configured to store therein a physical address of data to be accessed in the memory and an access type in association with each other for each certain processing. The access type is read access or write access. The memory protection setting controller is configured to refer to the processing table management controller, and set a protection address in the memory for each certain processing. At least one of the read access and the write access by the non-secure OS is prohibited. The processing determination controller is configured to receive the access type and a physical address of an access destination, further receive data to be written when the access type is the write access, acquire a list of processing from the processing table management controller, and determine a type of processing to be performed. The processing executing controller is configured to receive, from the processing determination controller, the type of processing, the access type, and the physical address of the access destination, further receive, from the processing determination controller, the data to be written when the access type is the write access, acquire data from a secure device access controller when the access type is the read access, and perform the processing on the data. The secure device access controller is configured to receive the access type and the physical address of an access destination, further receive data to be written when the access type is the write access, and access a peripheral identified by the physical address. The entry controller is configured to receive, from an OS switcher of the monitor, the access type and a physical address of an access destination, further receive, from the OS switcher, data to be written when the access type is the write access, call the processing determination controller, acquire read data from the processing determination controller when the access type is the read access, and call the OS switcher. The monitor includes the OS switcher, an instruction analysis controller, an address translation controller, and an address translation controller. The OS switcher is configured to control switching between the secure OS and the non-secure OS. The instruction analysis controller is configured to acquire an instruction implementation of which is rejected, determine the access type, acquire a virtual address of a read destination when the access type is the read access, and acquire data to be written when the access type is the write access. The address translation controller is configured to translate the virtual address into the physical address by a page table of the non-secure OS.

First Embodiment

The following describes a first embodiment of an information processing apparatus 1 with reference to the accompanying drawings. FIG. 1 schematically illustrates a hardware structure of the information processing apparatus 1 described in the first embodiment. The information processing apparatus 1 includes a CPU 200 (processor), a main memory 300, and a storage 100. The CPU 200 includes a memory protection unit 201, an interrupt controller 202, a register unit (not illustrated), and an arithmetic unit (not illustrated). The storage 100 stores therein a monitor module 500, which may be simply referred to as a monitor 500, a secure OS module 700, which may be simply referred to as a secure OS 700, and a non-secure OS module 600, which may be simply referred to as a non-secure OS 600, wherein these are programs executed by the CPU 200.

The CPU 200 executes a sequence of instructions stored in the main memory 300. The main memory 300 stores therein a program called an operating system (OS), which is executed by the CPU 200. The main memory 300 includes a context storing module 301. Hereinafter, the expression, " . . . module" may be referred to as " . . . controller". The OS is a program that manages various devices and enables the devices to be used by applications. The CPU 200 has a function to run a plurality of OSs. In the embodiment, the CPU 200 runs a secure OS and a non-secure OS. The monitor module 500 is a program that manages the OS modules 600 and 700, such as activating and switching the OS modules 600 and 700, and management of hardware resources used by the OS modules 600 and 700. The number of OSs concurrently executable depends on the number of programs the CPU can concurrently execute. In the switching of the OSs in the embodiment, the respective OSs are executed by being switched in a time division manner, thereby making the multiple OSs look like that they are virtually executed. The monitor module 500 is called by a request from the OS or an interrupt from the hardware and controls the switching of the OSs. A peripheral 400 is used by being connected to the information processing apparatus 1. The peripheral 400 is a device such as a universal serial bus (USB) device, a mouse, a keyboard, or a hard disk drive.

Figure 2:
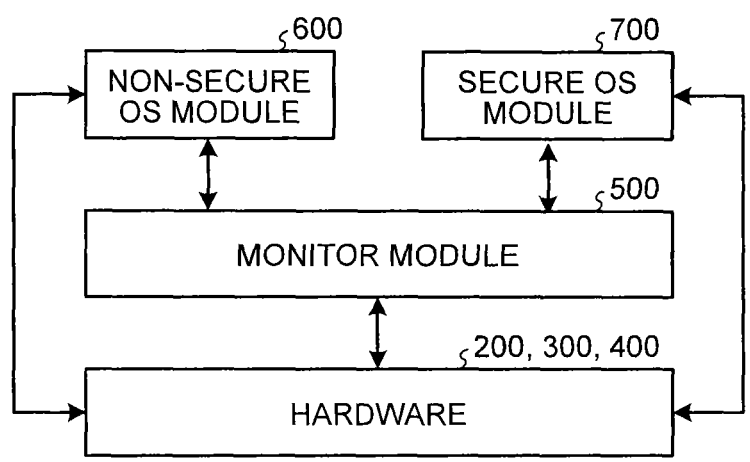
FIG. 2 is a schematic diagram illustrating a software structure of the information processing apparatus in the first embodiment.
Figure 3:
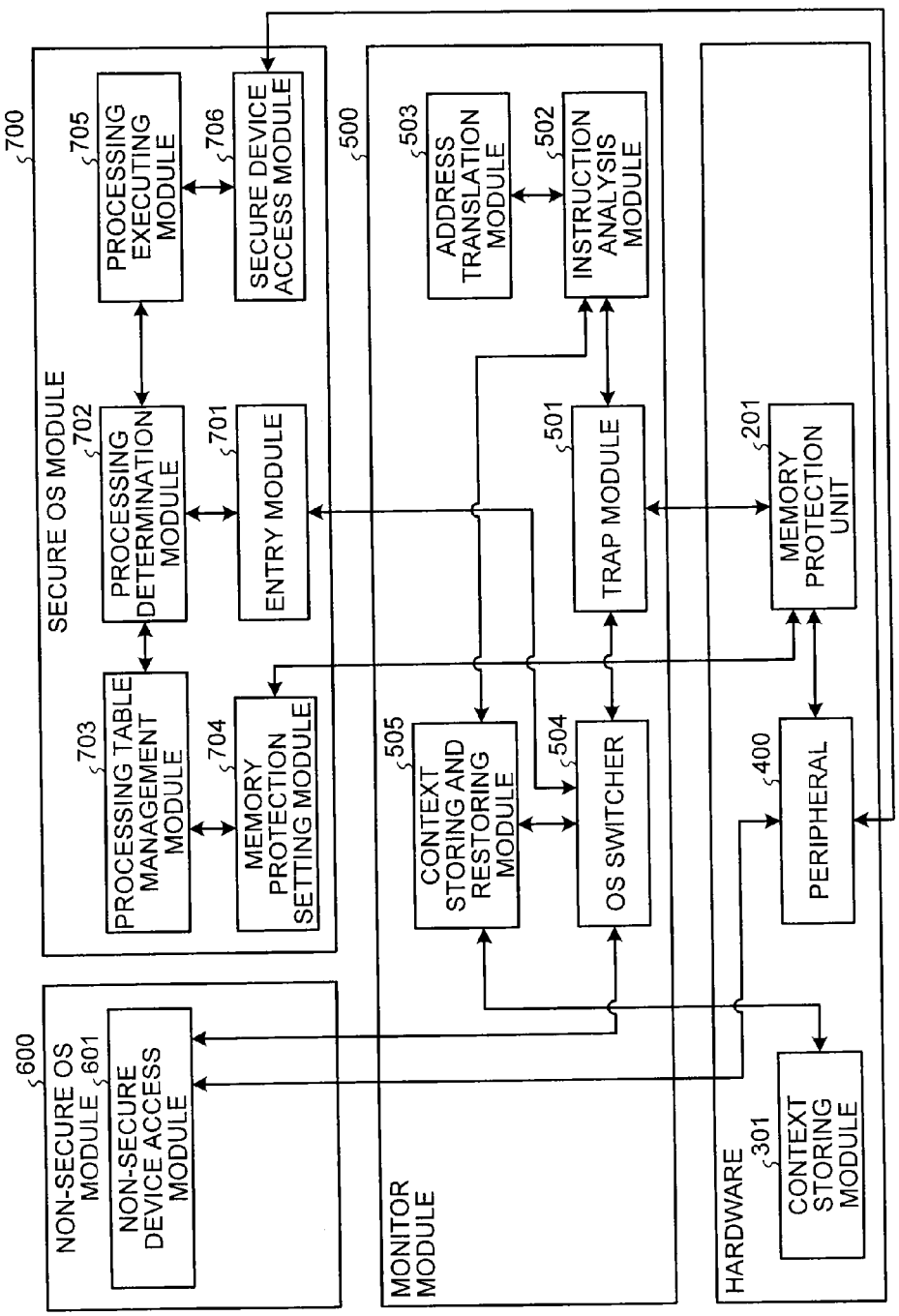
FIG. 3 is a schematic diagram illustrating the software structure of the information processing apparatus in the first embodiment.

FIGS. 2 and 3 illustrate an example of hardware including the CPU 200 and the main memory 300 and a structure of software executed by the CPU 200 according to the first embodiment. The software described below may be achieved by hardware such as an electronic circuit. The monitor module 500, the non-secure OS module 600, and the secure OS module 700 illustrated in FIGS. 2 and 3 are the software. The following describes the first embodiment including a virtualization function of the peripheral in detail with reference to FIG. 3, which illustrates the detailed internal structure of that illustrated in FIG. 2.

The non-secure OS module 600 includes a non-secure device access module 601. The non-secure device access module 601 has a function to send a read or write instruction to the peripheral 400 to control the peripheral. The monitor module 500 includes a context storing-restoring module 505, an OS switcher 504, a trap module 501, an instruction analysis module 502, and an address translation module 503.

The context storing-restoring module 505 has a function to store the context of the OS running before being switched (referred to as a switching origin OS) in the context storing module 301 and restore the context of the OS to be switched (referred to as a switching destination OS) from the context storing module 301 when the OSs are switched. The storing and the restoring of the contexts of the respective OSs in the switching of the OSs can make the OSs look like in a pseudo manner that they are run concurrently in a single processor.

The OS switcher 504 has a function to detect a switching instruction of the OSs and instruct the context storing-restoring module 505 to store and restore the respective contexts. The OS switcher 504 may be called by an entry module 701 with the OS switching instruction or by the trap module 501 when a memory protection exception occurs in the monitor module 500. When called by the trap module 501, the OS switcher 504 instructs the context storing-restoring module 505 to store the context of the non-secure OS and restore the context of the secure OS. Thereafter, the OS switcher 504 passes, to the entry module 701 of the secure OS module 700, a type of instruction (read or write), a physical address of an object for reading or writing, and data to be written when the type is the write instruction, which are received from the trap module 501. When called by the entry module 701, the OS switcher 504 receives the read result from the entry module 701, and instructs the context storing-restoring module 505 to store the context of the secure OS and restore the context of the non-secure OS. Thereafter, the OS switcher 504 writes the read result in the register indicated by information about a read destination register stored by the instruction analysis module 502. Then, the OS switcher 504 returns to the next instruction of the instruction by which the memory protection exception occurs in the non-secure device access module 601.

The trap module 501 is called by the memory protection unit 201 when the memory protection exception occurs in the memory protection unit 201. In this case, the trap module 501 acquires a virtual address of the memory storing therein the instruction by which the exception occurs and passes it to the instruction analysis module 502. The trap module 501 also has a function to pass, to the OS switcher 504, the type of instruction (read or write), the physical address of the object for reading or writing, and the data to be written when the instruction is the write instruction, which are received from the instruction analysis module 502 after the completion of instruction analysis, and instructs the OS switcher 504 to switch the OSs.

The instruction analysis module 502 is called by the trap module 501, and analyzes the instruction by which the exception occurs, as a function thereof. The instruction analysis module 502 receives the virtual address of the storing therein the instruction to be analyzed, calls the address translation module 503, and acquires the physical address corresponding to the virtual address. The instruction analysis module 502 acquires the instruction from the acquired physical address and analyzes the type of instruction (read or write), information about the register storing therein the virtual address of the object for reading or writing, information about a storing destination register when the type is the write instruction, and information about a register storing therein a value to be written or information about an immediate value to be written when the type is the write instruction. The instruction analysis module 502 refers to the register on the basis of the information about the register storing therein the virtual address of the object for reading or writing and acquires the information about the virtual address of the object for reading or writing. The instruction analysis module 502 calls the address translation module 503, by which the virtual address of the object for reading or writing is converted into the physical address. When the instruction is the write instruction and a value to be written is stored in the register, the instruction analysis module 502 acquires the value to be written from the register. When the instruction is the read instruction, the instruction analysis module 502 stores therein the information about the read destination register. The instruction analysis module 502 returns, to the trap module 501 as analysis results, the type of instruction (read or write), the physical address of the object for reading or writing, and the data to be written (information about the immediate value included in the instruction or the data to be written acquired from the register) when the type is the write instruction.

The address translation module 503 has a function to refer to a page table of a task executed by the non-secure OS, convert the virtual address sent from a calling origin into the physical address, and return the physical address to the calling origin. The address translation module 503 acquires a value of a page table address register of the non-secure OS illustrated in FIG. 4 in order to acquire the location where the page table of the non-secure OS is stored. Thereafter, the address translation module 503 refers to the memory indicated by the value of the register, converts the virtual address sent from the calling origin into the physical address, and returns the physical address to the calling origin. For example, the physical address 0xF0001000 is returned when the virtual address is 0x00001000.

The secure OS module 700 includes a processing table management module 703, a memory protection setting module 704, a processing determination module 702, the entry module 701, a processing executing module 705, and a secure device access module 706.

Figures 4, 5:
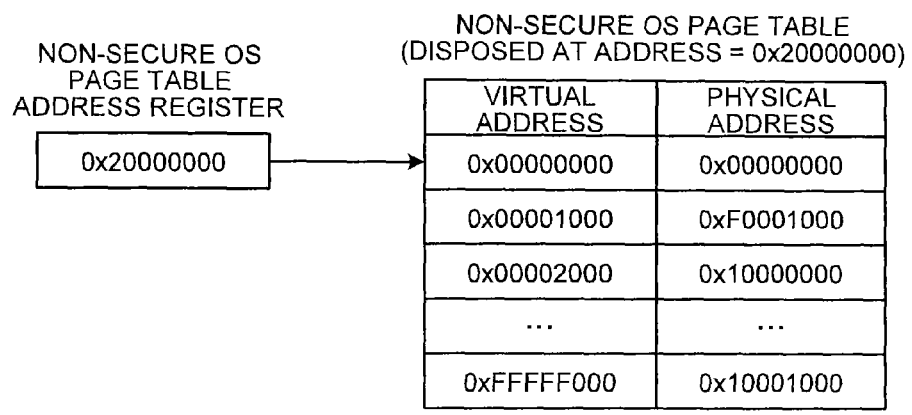
FIG. 4 is a schematic diagram illustrating the value of a page table address register of a non-secure OS.
FIG. 5 is a table illustrating filtering settings in the first embodiment.

The processing table management module 703 has a function to set the setting of and acquire a processing table illustrated in FIG. 5. The processing table includes, as data, a starting physical address and a size of a memory to be detected, and the type (direction) of access to be detected (read or write) when the access is made, and type of filtering performed when the access is made as illustrated in FIG. 5. For example, when the starting physical address is 0x10000010, the size is 1024, the direction is write, and the type of processing (filtering) is encryption, data is encrypted in the case that the data is written in an area having a physical address equal to or larger than 0x10000010 and smaller than (0x10000010+1024). For example, when the physical address is a transmission buffer area of a network card, a packet to be transmitted is encrypted. For another example, when the physical address is a write buffer area of a storage, the data written in the storage is encrypted.

The memory protection setting module 704 has a function to acquire the content of the processing table from the processing table management module 703 and set the contents to detect the memory access from the non-secure OS to the memory protection unit 201. The memory protection setting module 704 acquires the whole of the processing table, passes the starting physical addresses and the sizes of the respective items to the memory protection unit 201, and sets a read prohibition setting when the direction is read, a write prohibition setting when the direction is write, and a read-write prohibition setting when the direction is read and write. In this way, the memory protection setting module 704 sets a protection address in a memory space.

The processing determination module 702 receives the physical address of the object to be accessed and the type of access (read or write) from the entry module 701. When the type is write, the processing determination module 702 receives the data to be written from the entry module 701 and receives the processing table from the processing table management module 703. The processing determination module 702 has a function to search for the items including the physical address of the object to be accessed and determine the type of filtering corresponding to the physical address. For example, when the physical address of the object to be accessed is 0x10000011, and the type of access is read, the items corresponding to the physical address are as follows: the starting address is 0x10000010, the size is 1024, the direction is read, and the type of filtering is decryption because 0x10000010≤0x10000011<(0x10001000+1024). The type of filtering is thus determined as decryption. The processing determination module 702 also passes, to the processing executing module 705, the physical address of the object to be accessed, the type of access (read or write), and the data to be written when the type is write together with the type of filtering. The processing determination module 702 receives, as a return value from the processing executing module 705, the read data when the type is read, and returns the data to the entry module 701. When the type is write, the processing determination module 702 calls the entry module 701 without passing anything.

The entry module 701 has a function to receive, from the OS switcher 504, the physical address of the object to be accessed and the data to be written when the type is write, and pass them to the processing determination module 702. The entry module 701 receives, as a return value from the processing determination module 702, the read data when the type is read, and passes the data to the OS switcher 504. When the type is write, the entry module 701 calls the processing determination module 504 without passing anything.

The processing executing module 705 receives, from the processing determination module 702, the physical address of the object to be processed, the type of access (read or write), and the data to be written when the type is write together with the type of filtering. When the type is write, the processing executing module 705 performs filtering in accordance with the type of filtering. For example, when the type of filtering is encryption, the processing executing module 705 encrypts the received data to be written while when the type of filtering is recording, the processing executing module 705 keeps a write log of the received data to be written. When the type of filtering is discarding and the type is write, the processing executing module 705 calls the processing determination module 702 without any change. When the type of filtering is discarding and the type is read, the processing executing module 705 produces dummy data and returns the dummy data to the processing determination module 702. When the type of filtering is filtering without discarding data, the processing executing module 705 passes, to the secure device access module 706, the physical address of the object to be accessed, the type of access (read or write), and the filtered data to be written when the type is write. The processing executing module 705 receives the read data as a return value from the secure device access module 706 when the type is read. When the type is read, the processing executing module 705 performs filtering in accordance with the type of filtering and returns the filtered data to the processing determination module 702. For example, when the type is read and the filtering is decryption, the processing executing module 705 decrypts the data received from the secure device access module 706 and thereafter returns the decrypted data to the processing determination module 702. When the type is write, the processing executing module 705 calls the processing determination module 702 without receiving anything from the secure device access module 706.

The secure device access module 706 receives the physical address of the object to be accessed, the type of access (read or write), and the data to be written when the type is write. The secure device access module 706 instructs the peripheral 400 indicated by the physical address of the object to be accessed to read data, and receives the read data from the peripheral 400 when the type is read. When the type is write, the secure device access module 706 passes the data to be written to the peripheral 400 and instructs the peripheral 400 to write the data. When the type is read, the secure device access module 706 returns the read data to the processing executing module 705, whereas when the type is write, the secure device access module 706 calls the processing executing module 705 without passing anything.

The hardware includes the context storing module 301, the peripheral 400, and the memory protection unit 201. The context storing module 301 is called by the context storing-restoring module 505, and stores the context of the non-secure OS and acquires the context of the secure OS, as a function thereof, as illustrated in FIG. 6.

The peripheral 400 is called by the non-secure device access module 601 and the secure device access module 706 that designate a virtual address of an access destination. The peripheral 400 then passes, to the memory protection unit 201, information about the access origin (the non-secure device access module 601 or the secure device access module 706), the physical address of the access destination, and the type of access (read or write) after the translation of the virtual address into the physical address, receives a result of determination on whether the access can be made from the memory protection unit 201, and actually accesses the peripheral when it is determined that the access can be made, as a function thereof.

The memory protection unit 201 has a function to receive, from the memory protection setting module 704, the starting physical address and the size of an object of access control, and the type of access to be protected (read or write), and reply for a determination request on whether the access can be made from the peripheral 400 on the basis of the received data. The memory protection unit 201 receives, from the peripheral 400, the physical address of the object to be accessed, the type of access (read or write), and the information about the access origin, and determines whether a coincident item is included in the protection setting received from the memory protection setting module 704 when the information about the access origin is the non-secure device access module 601. When the coincident item is included, the memory protection unit 201 calls the trap module 501. When no coincident item is included or the information about the access origin is the secure device access module 706, the memory protection unit 201 returns the information indicating that the access can be made to the peripheral 400.

Figure 7:
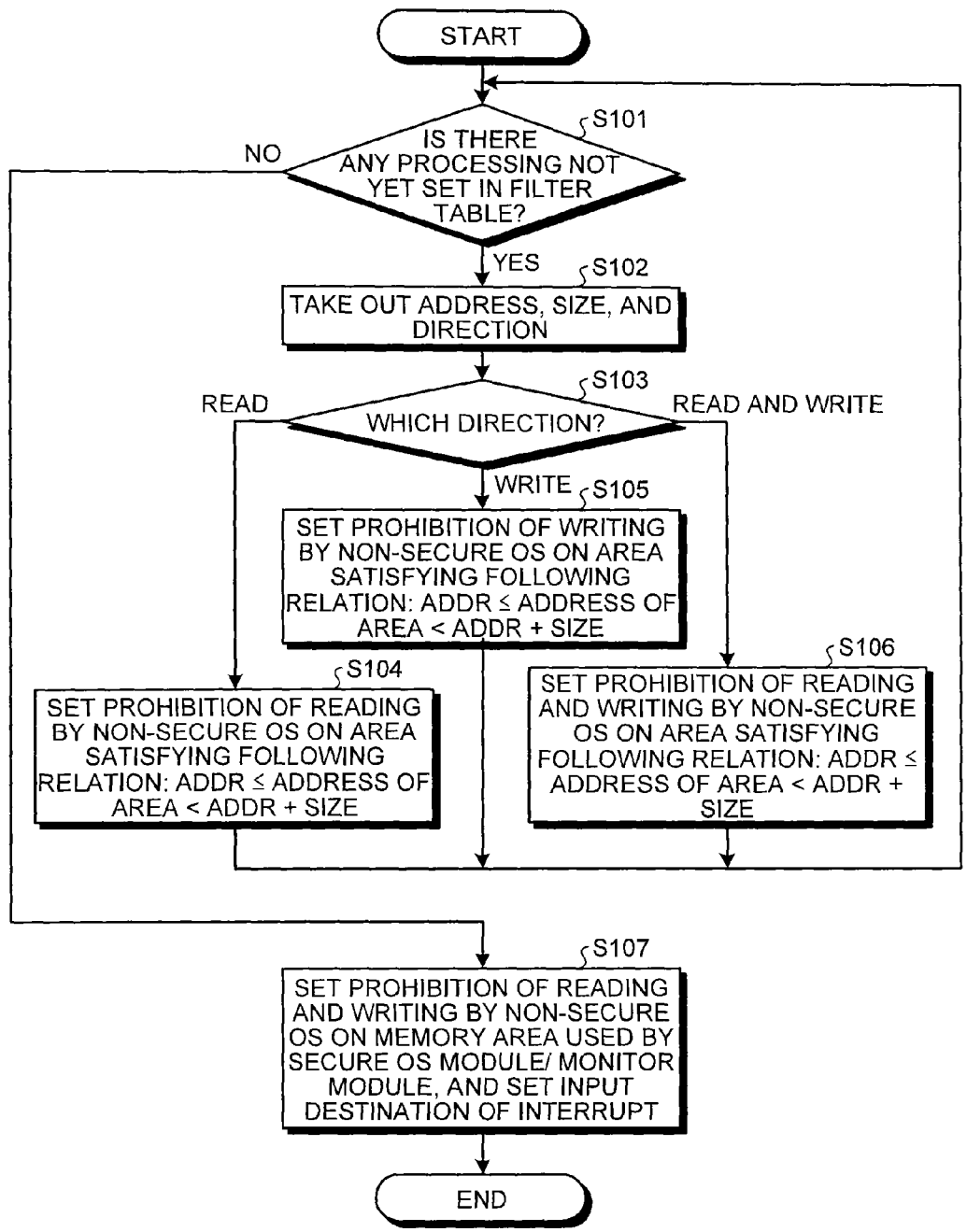
FIG. 7 is a flowchart illustrating the processing performed when the secure-OS module is activated in the first embodiment.

The following describes a processing procedure of memory protection setting performed at the activation of the secure OS module 700 stored in the storage 100 with reference to the flowchart illustrated in FIG. 7. The memory protection setting module 704 receives the processing table from the processing table management module 703, takes out one item from the processing table, and determines if there is any processing not yet set in a filter table (step S101). If there is some processing not yet set in the filter table (Yes at step S101), the memory protection setting module 704 takes out the address (addr), the size (size), and the direction information (step S102). The memory protection setting module 704 determines the direction information of the taken out processing (step S103). If the direction information is read (read at step S103), the memory protection setting module 704 sets, to the memory protection unit 201, the prohibition of reading by the non-secure OS on the area having an address equal to or larger than addr and smaller than (addr+size) (step S104). If the direction information is write (write at step S103), the memory protection setting module 704 sets, to the memory protection unit 201, the prohibition of writing by the non-secure OS on the area having an address equal to or larger than addr and smaller than (addr+size) (step S105). If the direction information is read and write (read and write at step S103), the memory protection setting module 704 sets, to the memory protection unit 201, the prohibition of reading and writing by the non-secure OS on the area having an address equal to or larger than addr and smaller than (addr+size) (step S106). Thereafter, the processing returns to step S101. If no processing included in the processing table is not set in the filter table (No at step S101), the memory protection setting module 704 sets, to the memory used by the secure OS module 700 and the monitor module 500, the prohibition of reading and writing of the memory by the non-secure OS module 600, and sets an input destination of an interrupt to the OS (step S107). Thereafter, the processing of memory protection setting ends.

Figure 8:
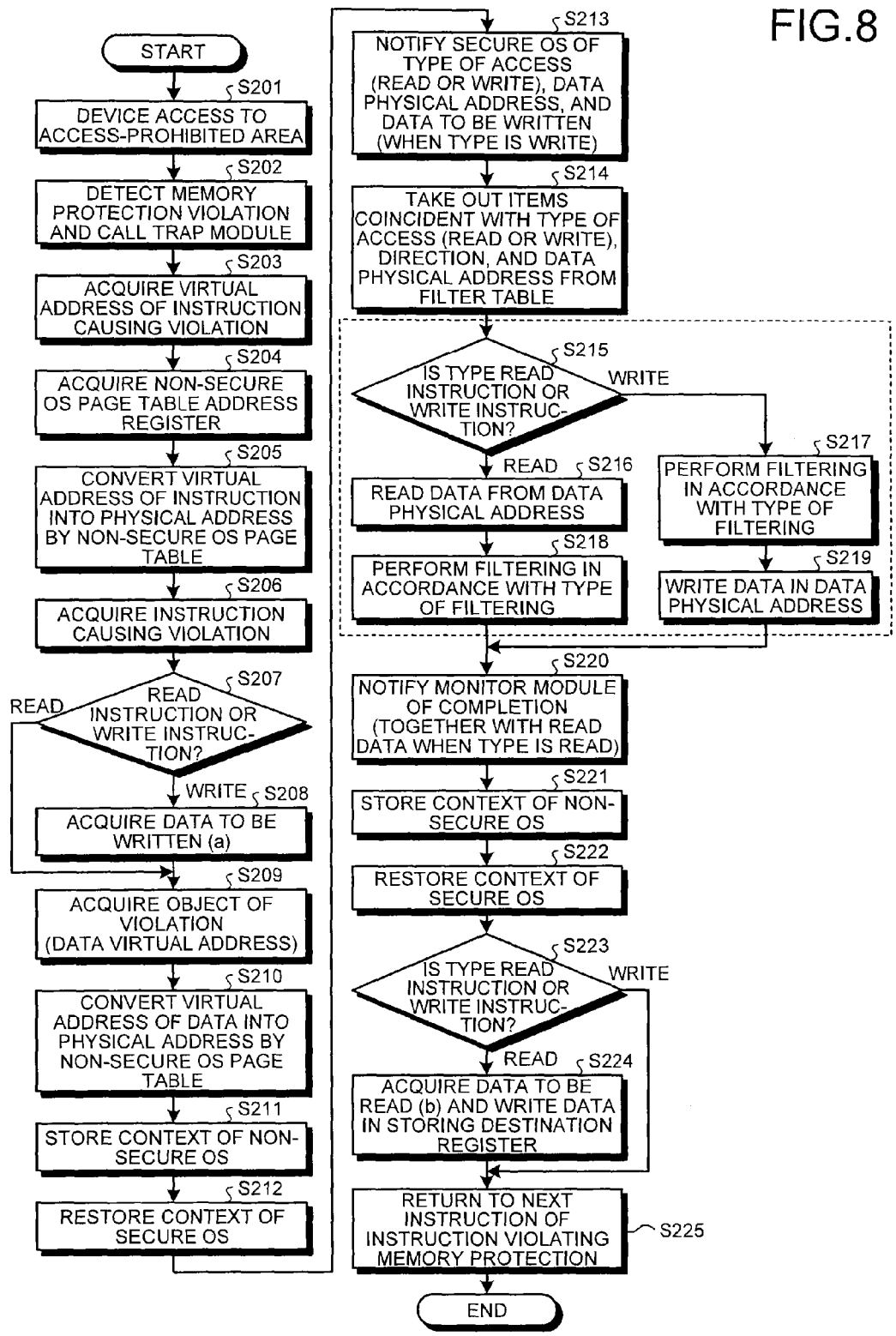
FIG. 8 is a flowchart illustrating the processing when memory access is detected in the first embodiment.

The following describes a flow when memory access is detected with reference to the flowchart illustrated in FIG. 8. The processing illustrated in FIG. 8 is performed when the non-secure OS module 600 accesses the area to which the memory protection illustrated in the flow of FIG. 7 is performed. The non-secure device access module 601 accesses the access-prohibited area for the peripheral 400 as a device access (step S201). The memory protection unit 201 detects that the access violates the memory protection setting and calls the trap module 501 (step S202). The trap module 501 calls the instruction analysis module 502. The instruction analysis module 502 acquires the virtual address of the instruction by which the access is made to the access-prohibited area (step S203). The instruction analysis module 502 passes the virtual address to the address translation module 503. The address translation module 503 refers to the value of the non-secure OS page table address register in order to translate the virtual address into the physical address (step S204). The address translation module 503 refers to the page table of the non-secure OS on the basis of the value of the non-secure OS page table address register and translates the virtual address of the instruction by which the access is made to the access-prohibited area into the physical address (step S205). The instruction analysis module 502 refers to the destination indicated by the physical address and acquires the instruction by which the access is made to the access-prohibited area (step S206). The instruction analysis module 502 determines whether the instruction is the write instruction or the read instruction to the peripheral (step S207), and if the instruction is the write instruction (write at step S207), acquires the data to be written (step S208). The processing then proceeds to step S209. If the instruction is the read instruction (read at step S207), the processing proceeds directly to step S209.

The instruction analysis module 502 acquires the virtual address of the access destination of the peripheral from the analysis result of the instruction (step S209). The instruction analysis module 502 passes the virtual address to the address translation module 503. The address translation module 503 refers to the page table and translates the virtual address into the physical address (step S210).

The trap module 501 calls the OS switcher 504. The OS switcher 504 requests the context storing-restoring module 505 to store the context of the non-secure OS (step S211). The OS switcher 504 requests the context storing-restoring module 505 to restore the context of the secure OS (step S212). The OS switcher 504 passes, to the entry module 701, the type of access (read or write), the physical address of the access destination of the peripheral, and the data to be written when the type is write, that are analyzed by the instruction analysis module 502 (step S213).

The entry module 701 calls the processing determination module 702. The processing determination module 702 receives the processing table from the processing table management module 703, searches for, in the processing table, the items coincident with the type of access (read or write) and the physical address of the access destination that are received from the entry module 701, and takes out the coincident items (step S214). The processing determination module 702 determines the type of access (read or write) of the taken out processing (step S215). If the type of access (read or write) of the taken out processing is read (read at step S215), the secure device access module 706 acquires the data from the destination, which is indicated by the received physical address of the access destination, of the peripheral 400 (step S216), and performs filtering in accordance with the type of filtering of the coincident items in the processing table (step S218). When the type of filtering is discarding, the secure device access module 706 performs nothing at step S216 and produces dummy data at step S218.

If the type of access (read or write) of the taken out processing is write (write at step S215), the processing executing module 705 performs filtering on the data to be written in accordance with the type of filtering (step S217). Thereafter, the secure device access module 706 writes the filtered data in the destination, which is indicated by the received physical address of the access destination, of the peripheral 400 (step S219). When the type of filtering is discarding, the secure device access module 706 performs nothing at step S217 and at step S219.

A completion notification is transmitted to the OS switcher 504 of the monitor module 500 together with the data obtained by filtering the read data when the type is read (step S220). The OS switcher 504 instructs the context storing-restoring module 505 to store the context of the non-secure OS (step S221) and then instructs the context storing-restoring module 505 to return the context of the secure OS (step S222). The OS switcher 504 determines the type of access (step S223). If the type of access is read (read at step S223), the read data passed from the entry module 701 is written in the register serving as the storing destination analyzed by the instruction analysis module 502. Thereafter, the processing proceeds to step S225. If the type of access is write (write at step S223), the processing proceeds directly to step S225. At step S225, a return is made to the next instruction of the instruction by which the device access is made to the access-prohibited area, and thereafter the processing ends.

Figure 9:
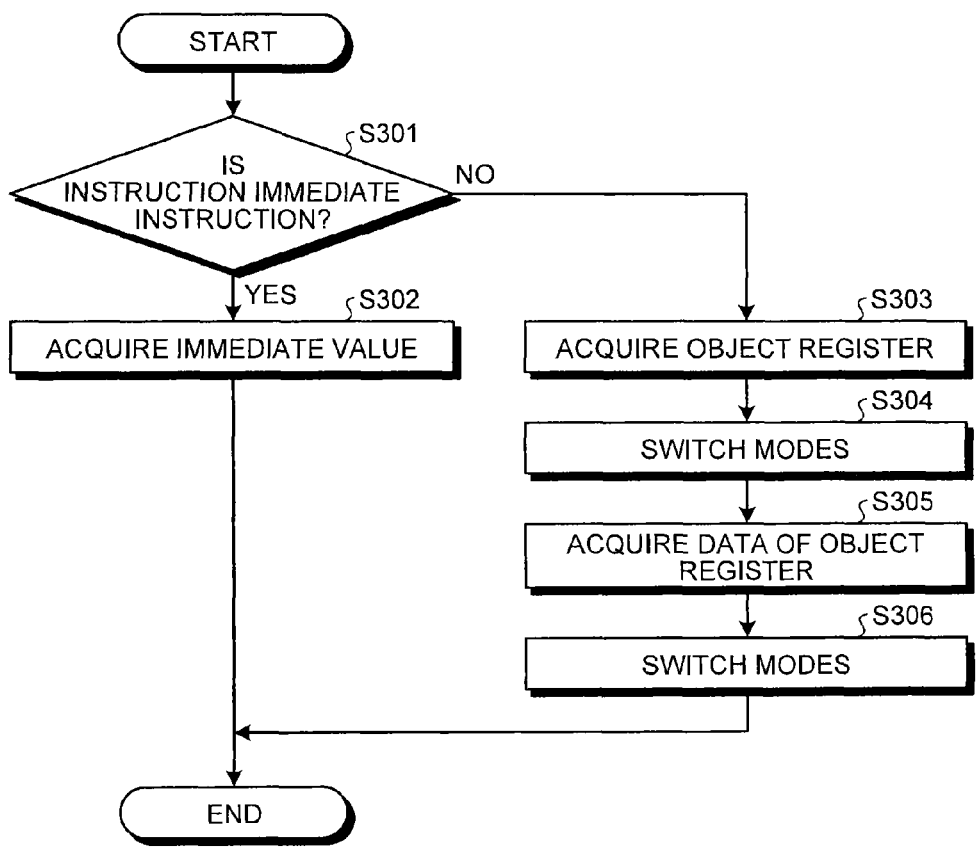
FIG. 9 is a flowchart illustrating in detail the processing when data to be written is acquired in the first embodiment.

FIG. 9 is a flowchart illustrating in detail the processing of the acquisition of data to be written (a) at step S208 of FIG. 8. The write instruction has the following two types: one is an immediate value instruction that includes the data to be written and the other is an instruction by which data stored in the register is written. The two types of instructions thus need to be differentiated when the data to be written is acquired. The following describes the flow of the processing.

When the data to be written is acquired, the instruction analysis module 502 determines whether the instruction is the immediate value instruction (step S301). If the instruction is the immediate value instruction (Yes at step S301), the instruction analysis module 502 acquires an immediate value because the instruction includes the immediate value (step S302). Thereafter, the processing ends.

If the instruction is not the immediate value instruction (No at step S301), the instruction analysis module 502 acquires the register that stores therein data to be written (step S303). The instruction analysis module 502 further switches the current mode to the mode in which the access is made (step S304) and acquires the data of the register (step S305). Thereafter, the instruction analysis module 502 switches the mode to the mode before the mode switching (step S306). The reason why the modes are switched is that some processors have banked registers.

Figures 10, 11:
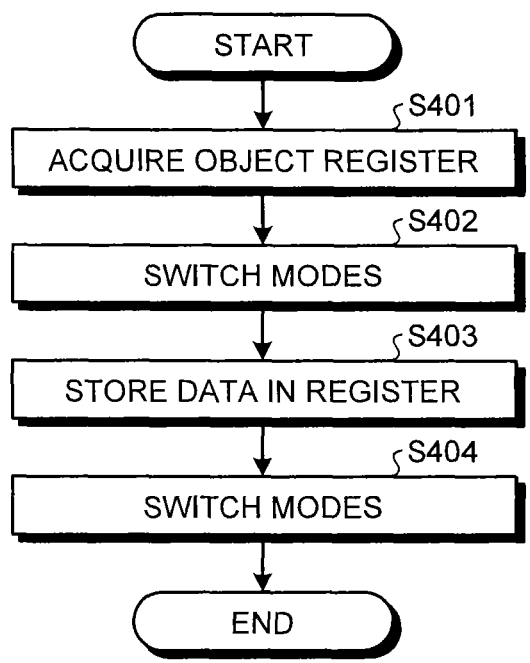
FIG. 10 is a flowchart illustrating in detail the processing when read data is stored in the first embodiment.
FIG. 11 is a schematic diagram illustrating another example of the contexts of the non-secure OS and the secure-OS.

FIG. 10 is a flowchart illustrating in detail the processing of the acquisition of the read data (b) of FIG. 8. The OS switcher 504 acquires an object register serving as the read destination (step S401) and switches the current mode to the mode in which the access is made (step S402). The OS switcher 504 stores the data received from the entry module 701 in the register (step S403) and switches the mode to the mode before the made switching (step S404). Thereafter, the processing ends. For example, as illustrated in FIG. 11, when the non-secure OS issues the instruction to read data in r0 to the area on which an access detection is performed, the value filtered by the secure OS on a value read from the peripheral is stored in the r0 of the non-secure OS.

Figure 12:
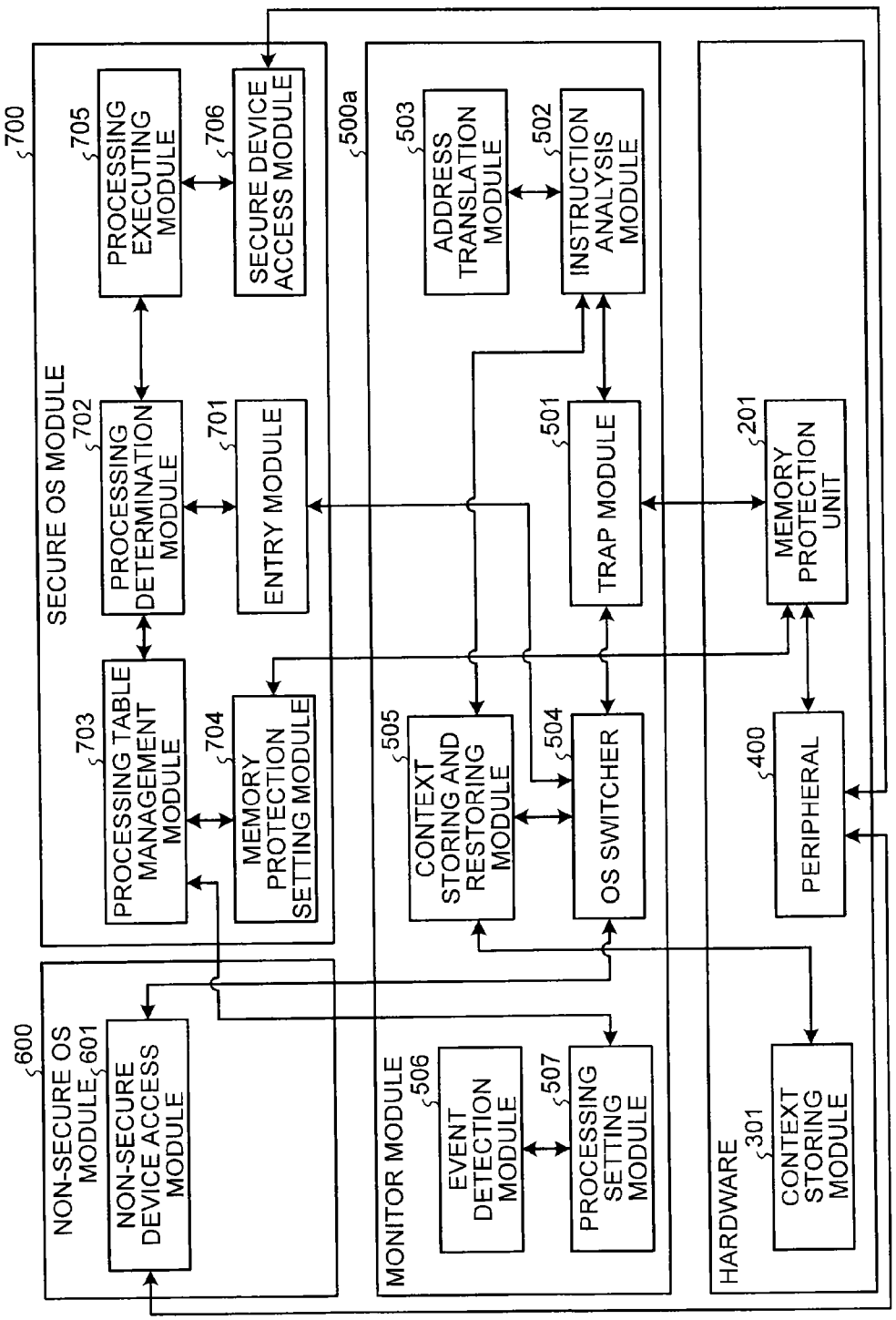
FIG. 12 is a schematic diagram illustrating the software structure of the information processing apparatus in a modification of the first embodiment.

In the structure illustrated in FIG. 3, the processing table is a fixed table. For example, no filtering may be performed when a bootloader is activated and the filtering may be performed when the activation of the OS starts. However, the fixed processing table makes it difficult to perform such processing. FIG. 12 illustrates a modification of the structure illustrated in FIG. 3. The modification can cope with a dynamic change in the processing table.

The structure illustrated in FIG. 12 differs from that illustrated in FIG. 3 in that a processing setting module 507 and an event detection module 506 are included in a monitor module 500a. The event detection module 506 has a function to detect an event such as the activation of the OS and instruct the processing setting module 507 to change the filtering setting. The processing setting module 507 has a function to update the processing table stored in the processing table management module 703 of the secure OS module 700. The processing setting module 507 passes the starting physical address, the size, the direction, and the type of filtering to the processing table management module 703 and requests the processing table management module 703 to add items to or delete items from the processing table.

Figure 13:
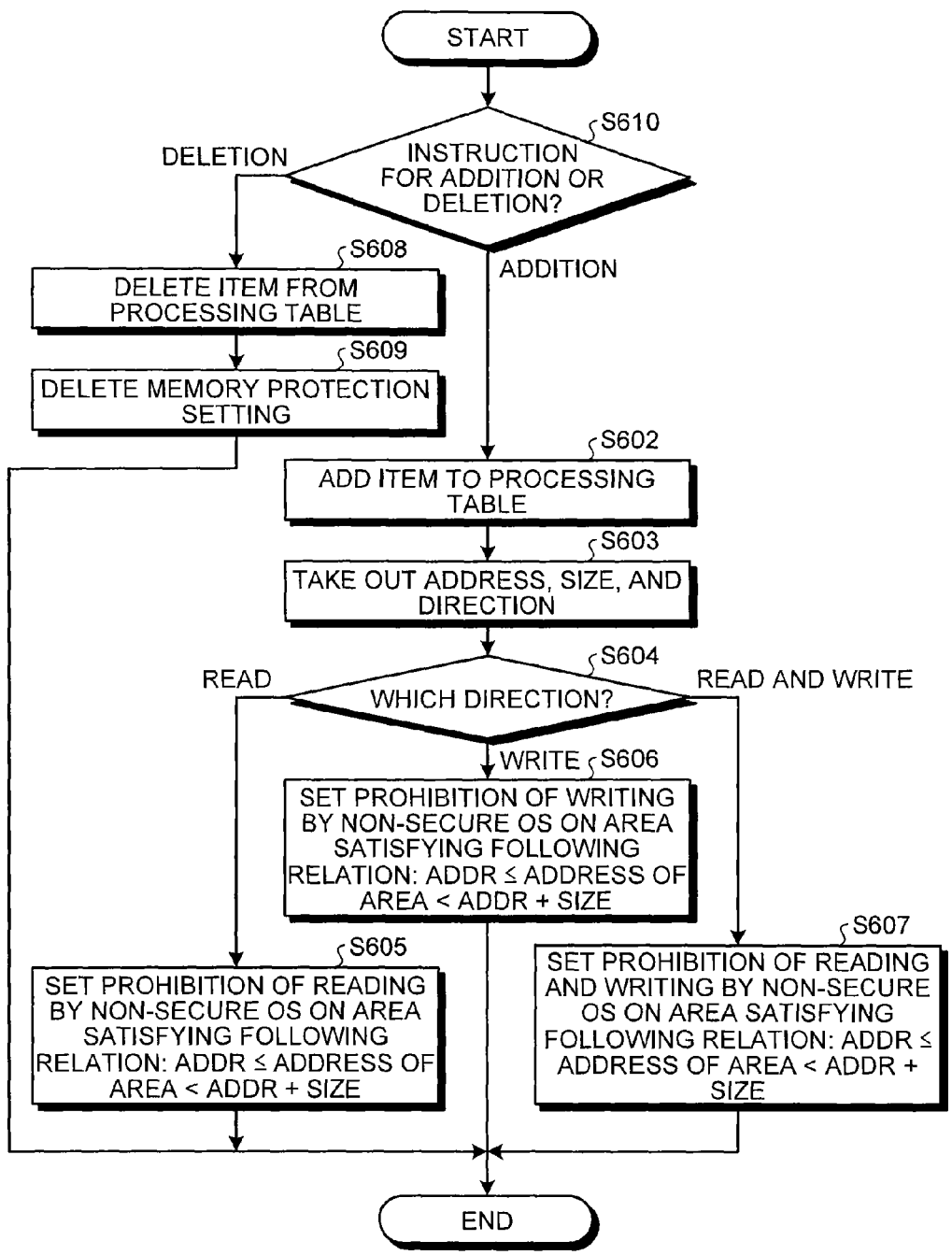
FIG. 13 is a flowchart illustrating the processing when a processing table is dynamically changed in the first embodiment.

FIG. 13 is a processing flow when the processing table is dynamically changed. The event detection module 506 calls the processing setting module 507 when an event occurs. The processing setting module 507 notifies the processing table management module 703 of the content to be changed. The processing table management module 703 determines whether the instruction is the instruction for addition or the instruction for deletion (step S610), and if the instruction is the instruction for deletion (deletion at step S610), deletes the designated item from the stored processing table (step S608). The processing table management module 703 deletes the memory protection setting from the memory protection unit 201 (step S609). Thereafter, the processing ends.

If the instruction is the instruction for addition (addition at step S610), the processing table management module 703 adds the item to the processing table (step S602), and then receives the information about the address, the size, and the direction information (step S603). The processing table management module 703 determines the direction information of the processing (step S604). If the direction information is read (read at step S604), the memory protection setting module 704 sets, to the memory protection unit 201, the prohibition of reading by the non-secure OS on the area having an address equal to or larger than addr and smaller than (addr+size) (step S605).

If the direction information is write (write at step S604), the memory protection setting module 704 sets, to the memory protection unit 201, the prohibition of writing by the non-secure OS on the area having an address equal to or larger than addr to smaller than (addr+size) (step S606). If the direction information is read and write (read and write at step S604), the memory protection setting module 704 sets, to the memory protection unit 201, the prohibition of reading and writing by the non-secure OS on the area having an address equal to or larger than addr and smaller than (addr+size) (step S607). Thereafter, the processing ends. In the modification, the flow at the activation is the same as that of FIG. 7, while the flow at detection of memory access is the same as that of FIG. 8.

The information processing apparatus 1 makes it possible to change the content of peripheral access while the non-secure device access module 601 of the non-secure OS module 600 operates without regard to the change. For example, the information processing apparatus 1 can transparently encrypt network communication when the peripheral is a network interface, and can transparently encrypt input and output of a storage when the peripheral is the storage. The information processing apparatus 1 can also convert access to a peripheral into access to another peripheral of a different type. For example, access to a local storage can be trapped and converted into access to a storage on a network. For another example, input and output of a software keyboard by a touch pad can be virtualized as a hardware keyboard. The memory protection function makes it impossible for the non-secure OS module 600 to falsify the processing of the secure OS module 700, thereby making it possible to perform filtering, such as data encryption, safely.

Second Embodiment

With Interrupt

The first embodiment, in which data is filtered at a timing the data is read or written, does not handle an interrupt from the peripheral. The computer actually often uses the interrupts such as notifications of data input from the peripherals. In a second embodiment, a structure is described in detail that can filter data at a timing an interrupt occurs.

Figure 14:
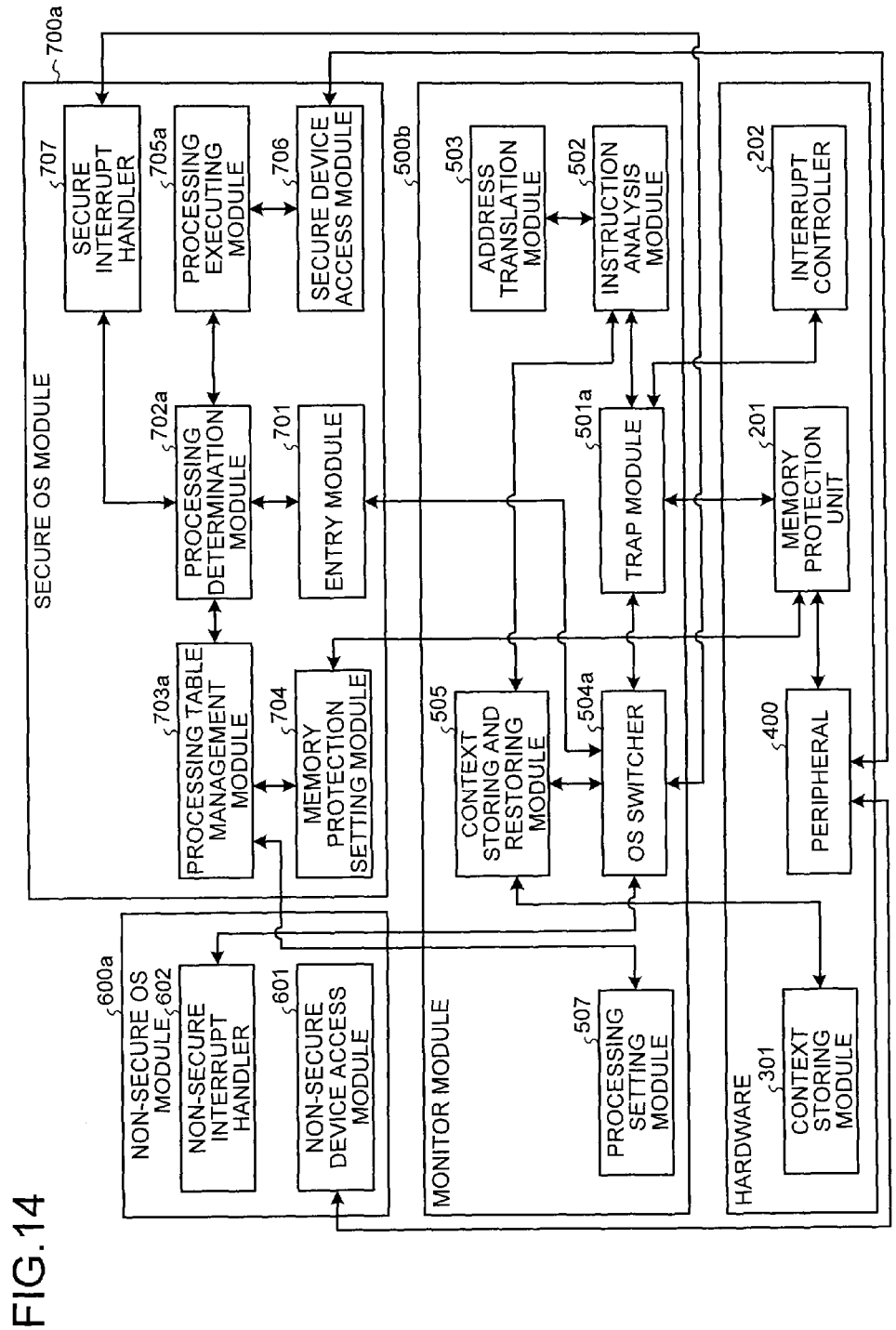
FIG. 14 is a schematic diagram illustrating the software structure of the information processing apparatus according to a second embodiment.

FIG. 14 illustrates an example of the structure of the information processing apparatus 1 in the second embodiment. The structure illustrated in FIG. 14 differs from that illustrated in FIG. 3 in that a non-secure OS module 600a includes an interrupt handler, a secure OS module 700a includes a secure interrupt handler 707, the hardware includes an interrupt controller 202, and furthermore a trap module 501a, an OS switcher 504a, a processing determination module 702a, a processing table management module 703a, and a processing executing module 705 have different functions from those of the corresponding respective modules in FIG. 3.

The interrupt controller 202 suspends the running processing when an interrupt request in relation to the peripheral is made and calls the trap module 501a, as a function thereof. The trap module 501a has a function to store a return destination and an execution state of the suspended processing in order to restart the running processing after the completion of the interrupt processing. Examples of the interrupt request include a notification of packet arrival when the peripheral is a network interface and a notification of disk read completion when the peripheral is a storage.

The trap module 501a has a function to call the OS switcher 504a when called by the interrupt controller 202, in addition to the function described in the first embodiment. When calling the OS switcher 504a, the trap module 501a notifies the OS switcher 504a that the call is originated in the interrupt controller 202.

The OS switcher 504a has a function to call the secure interrupt handler 707 when the OS switcher 504a is called by the trap module 501a and the trap module 501a is called by the interrupt controller 202, in addition to the function described in the first embodiment. In this case, the OS switcher 504a stores the information indicating that which one of the non-secure OS and the secure OS suspends the running processing. When the non-secure OS suspends the running processing, the OS switcher 504a instructs the context storing-restoring module 505 to store the context of the non-secure OS and return the context of the secure OS. After the context is stored and the context is returned, the OS switcher 504a calls the secure interrupt handler 707 of the secure OS module 700a. The OS switcher 504a has a function to instruct the context storing-restoring module 505 to store the context of the secure OS and return the context of the non-secure OS and furthermore call the secure interrupt handler 707 when called by the secure interrupt handler 707.

The secure interrupt handler 707 is called by the OS switcher 504a and calls the processing determination module 702, as a function thereof. In this case, the secure interrupt handler 707 determines the type of interrupt and notifies the processing determination module 702a of the type of interrupt. The type of interrupt is information that differentiates the peripheral in which the interrupt occurs and the factor of the interrupt. Examples of the type of interrupt include the disk read completion and a timer interrupt. The secure interrupt handler 707 is called by the processing determination module 702a when the interrupt filtering is completed and calls the OS switcher 504a, as a function thereof.

The processing table management module 703a has a function to set and get an interrupt processing table illustrated in FIG. 15, in addition to the function to set and get the processing table illustrated in FIG. 5, which is described in the first embodiment. In the interrupt processing table, the type of interrupt and the type of filtering performed when the interrupt occurs are listed. For example, when the type of interrupt is the disk read completion interrupt and the type of filtering is recording, the completion of the disk interrupt is recorded.

The processing determination module 702a has a function to receive the type of interrupt from the secure interrupt handler 707 and determine the filtering to be performed, in addition to the function described in the first embodiment. For this purpose, the processing determination module 702a acquires the interrupt processing table from the processing table management module 703a and searches for, in the interrupt processing table, the item coincident with the type of interrupt received from the secure interrupt handler 707. When the coincident item is found, the processing determination module 702a passes the corresponding type of filtering and the information about the type of interrupt to the processing executing module 705a and performs the filtering. After the completion of the filtering, the processing determination module 702a calls the secure interrupt handler 707. When no coincident item is found, the processing determination module 702a calls the secure interrupt handler 707 again without performing the filtering. In other words, when no coincident item is found, the interrupt is not performed.

The processing executing module 705a has a function to receive the type of filtering and the information about the interrupt type from the processing determination module 702a and perform the corresponding filtering, in addition to the function described in the first embodiment. When recording is designated as the type of filtering, for example, the processing executing module 705a records the occurrence of the interrupt in a recording medium.

The non-secure interrupt handler 602 is called by the OS switcher 504a and performs the interrupt processing, as a function thereof.

Figure 16:
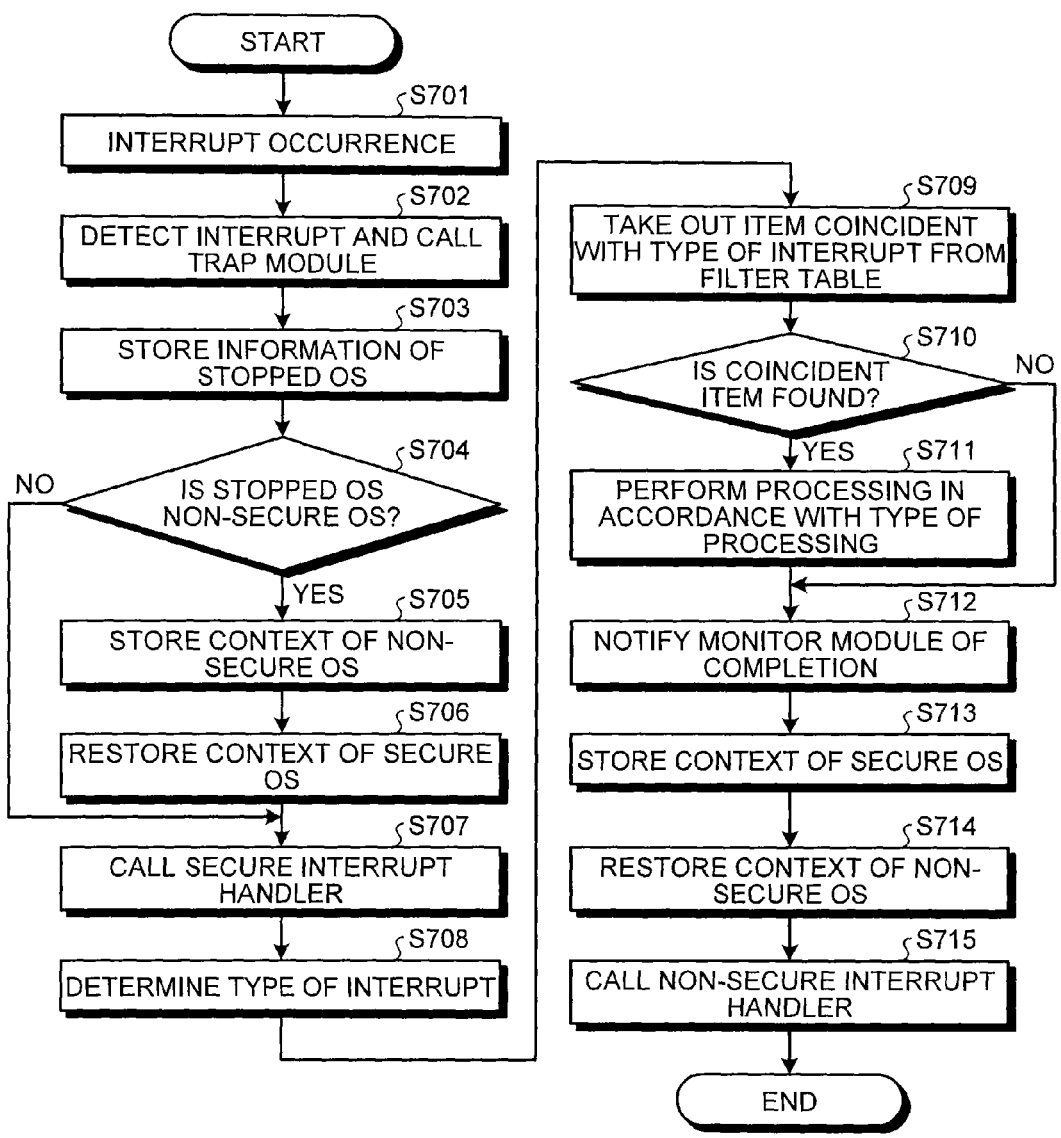
FIG. 16 is a flowchart illustrating the processing when an interrupt occurs in the second embodiment.

FIG. 16 is an exemplary flowchart of the processing when an interrupt occurs in the second embodiment. When an interrupt occurs (step S701), the interrupt controller 202 suspends the running processing and stores the return destination and the running state of the suspended processing, and thereafter calls the trap module 501a (step S702). The trap module 501a calls the OS switcher 504. The OS switcher 504 stores the information about the suspended OS (step S703). The OS switcher 504 determines whether the suspended OS is the non-secure OS module 600 (step S704). If it is determined that the suspended OS is the non-secure OS module 600 (Yes at step S704), the context storing-restoring module 505 stores the context of the non-secure OS (step S705) and returns the context of the secure OS (step S706). After the context is returned, the OS switcher 504 calls the secure interrupt handler 707 (step S707).

If the suspended OS is the secure OS module 700, the OS switcher 504 calls directly the secure OS module 700 (step S707). The secure interrupt handler 707 determines the type of interrupt (step S708) and calls the processing determination module 702a. The processing determination module 702a acquires the interrupt processing table from the processing table management module 703a, determines whether the processing coincident with the type of interrupt received from the secure interrupt handler 707 as a result of the determination at step S708 is included in the interrupt processing table, and takes out the coincident item (step S709). If the coincident item is found (Yes at step S710), the processing determination module 702a passes the type of filtering corresponding to the type of interrupt to the processing executing module 705a and calls the processing executing module 705a. The processing executing module 705a performs the corresponding filtering (step S711). Then, the processing proceeds to step S712.

If no coincident item is found (No at step S710), the processing proceeds to step S712. The secure interrupt handler 707 calls the OS switcher 504a of the monitor module 500b. The OS switcher 504a calls the context storing-restoring module 505. The context storing-restoring module 505 stores therein the context of the secure OS (step S713). The context storing-restoring module 505 returns the context of the non-secure OS. The OS switcher 504a calls the non-secure interrupt handler 602 (step S714). The non-secure interrupt handler 602 performs the interrupt processing (step S715). Thereafter the processing ends.

The flow at a detection of memory access in the second embodiment is the same as that of FIG. 8. The flow at the activation is nearly the same as that of FIG. 7. The flow, however, differs from that of FIG. 7 only in that the input destination of the interrupt in the interrupt input destination setting at step S107 is not set to the OS module but set to the monitor module.

As described above, the filtering can be performed not only at a timing data is read or written, but also at a timing an interrupt occurs. For example, the second embodiment can decrypt all of the input data at once at a timing the disk input completion interrupt is made and monitor the communication state while monitoring the packet arrival interrupt without any change in the non-secure OS module 600. The second embodiment can monitor the interrupt while keeping the completeness in the non-secure OS even when the processing of the non-secure OS module 600 is completed, because it is impossible for the non-secure OS module 600 to falsify the contents of the secure OS module 700.

Third Embodiment

In the first embodiment, simple filtering is performed when the access is made to the peripheral. In the filtering for network communication, particularly, when communication is automatically converted (encapsulated in) into communication through a virtual private network (VPN), the structure to filter data for the peripheral becomes complicated in a secure OS module 700c. For example, in a network using Ethernet (registered trade mark), when an Internet protocol (IP) packet is encapsulated by the VPN in a user datagram protocol (UDP) layer, the packet written by the non-secure OS is analyzed and the packet is divided into a medium access control (MAC) header, an IP header, a UDP header, and a UDP body. In such a case, the communication needs to be made with a VPN server, which is not the original communication destination. Thus, the MAC header, the IP header, and the UDP header are produced for the communication with the VPN server. Thereafter, the encrypted IP header, UDP header, and UDP body for the communication with the original communication destination need to be added to the produced headers.

Figure 17:
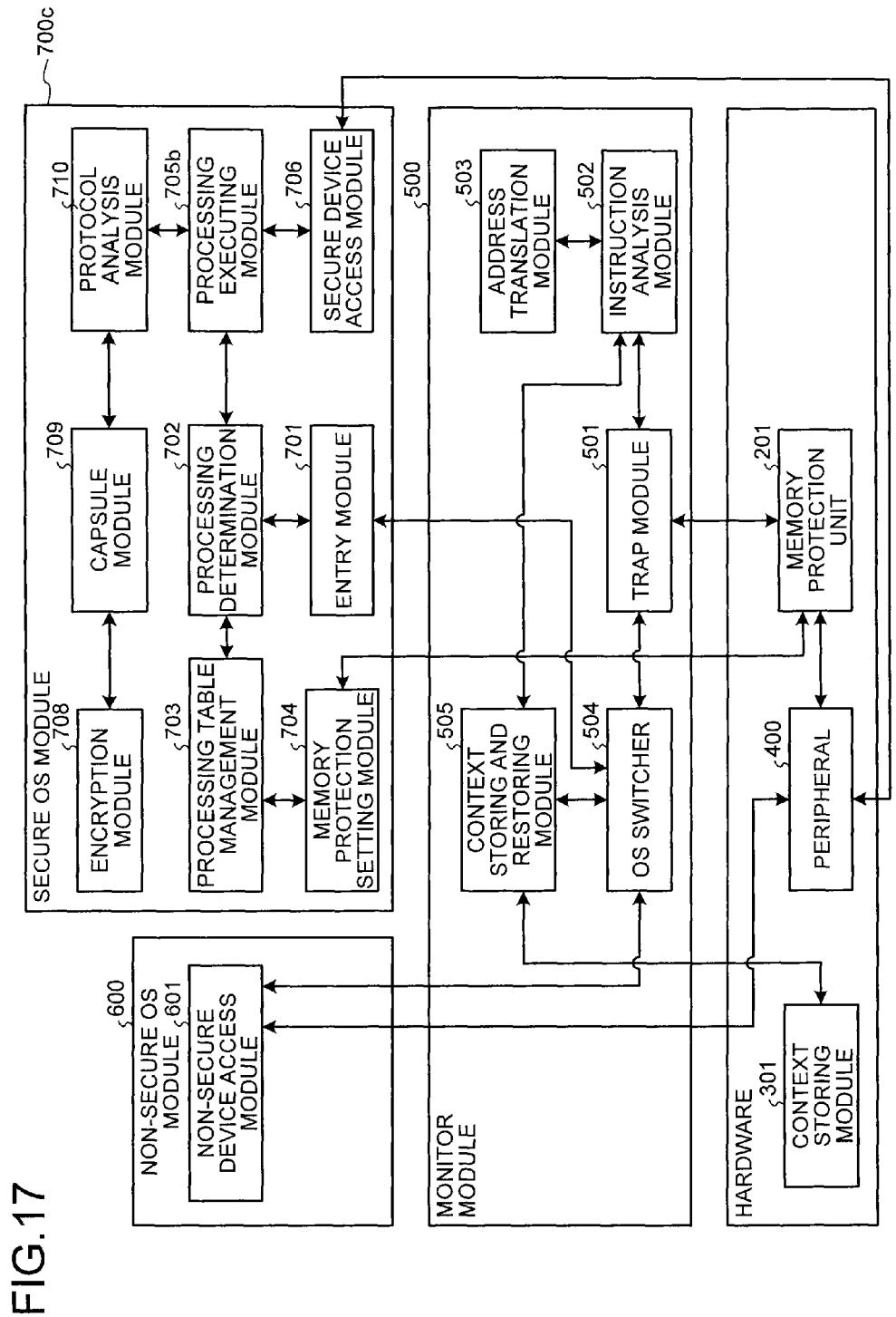
FIG. 17 is a schematic diagram illustrating the software structure of the information processing apparatus according to a third embodiment.

In a third embodiment, an example of a structure is described in which communication is automatically converted into the communication through the VPN with reference to FIG. 17. The structure illustrated in FIG. 17 differs from that illustrated in FIG. 3 in that a protocol analysis module 710, a capsule module 709, and an encryption module 708 are included and a processing executing module 705b has a different internal structure from that of the processing executing module 705.

The protocol analysis module 710 receives the physical address of the peripheral serving as the access destination of reading or writing, the type of access (read or write), and the data requested to be read when the type is write. The protocol analysis module 710 calculates the position in the packet from the physical address of the access destination. For example, when the physical address of a transmission buffer of the network device starts from 0x10000000 and the access destination is 0x10000100, the position in the packet is 0x100. The protocol analysis module 710 also has a function to call the capsule module 709, pass encapsulated data to the capsule module 709 to decapsulate the encapsulated data when the type is read, and pass data to be encapsulated to the capsule module 709 to encapsulate the data when the type is write. For example, in the example of the VPN using the UDP, the whole of the packet (the IP header, the UDP header, and the UDP body) following the MAC header is passed. The protocol analysis module 710 further has a function to read or write the data that does not correspond to the position in the encapsulated packet, but corresponds to the position in the decapsulated packet.

The capsule module 709 has a function to decapsulate the encapsulated data and encapsulate data to be written, which is not yet encapsulated. In the encapsulation, the capsule module 709 calls the encryption module 708 so as to encrypt data. The capsule module 709 then adds the headers for the communication with the VPN server. For example, in the example described above, the MAC header, the IP header, and the UDP header are added. In the decapsulation, the capsule module 709 removes the headers for the communication from the VPN server and calls the encryption module 708 so as to decrypt data. The capsule module 709 further has a function to re-write the header of the UDP packet. Actually, the VPN server communicates through the VPN. The address of the VPN server thus needs to be written in the actual packet.

The encryption module 708 is called by the capsule module 709 and encrypts or decrypts data, as a function thereof, using a key stored therein. The encryption module 708 receives, from the encryption module 708, the type of processing (encryption or decryption) and the data to be encrypted or decrypted, and returns the encrypted or decrypted data to the capsule module 709. As for the encryption algorithm, generally known algorithms such as an advanced encryption standard (AES) and a digital encryption standard (DES) may be used.

The processing executing module 705b has a function to pass, to the protocol analysis module 710, the physical address of the access destination, the type of access (read or write), and the data to be written when the type is write so as to request the data to be received and transmitted.

Figures 18, 19:
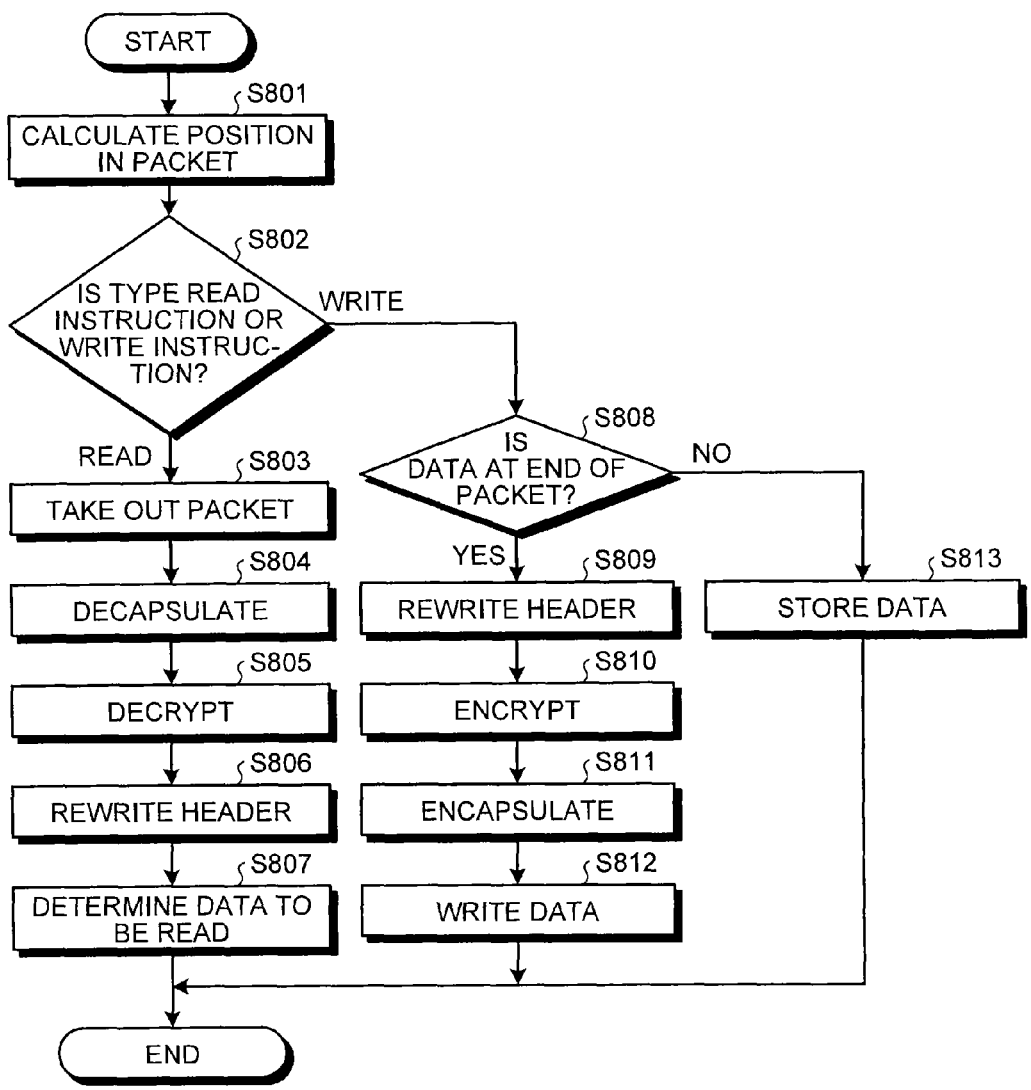
FIG. 18 is a table illustrating the filtering settings in the third embodiment.
FIG. 19 is a flowchart illustrating the flow of filtering in the third embodiment.

FIG. 18 illustrates an example of the processing table in the third embodiment. The transmission buffer and a receive buffer are included. The write limitation is set to transmission buffer while the read limitation is set to the receive buffer, thereby making it possible to trap the read and write operations of the buffers. In this case, data in the transmission buffer is encrypted and encapsulated while data in the receive buffer is decrypted and decapsulated. In the embodiment, either the read or write operation is limited. Both of the read and the write operations may be limited.

FIG. 19 is an exemplary flowchart illustrating the filtering in the third embodiment. The following describes only the filtering. The following description corresponds to the processing surrounded with the dotted line in FIG. 8, while the other processing is the same as that illustrated in FIG. 8. At the start of the filtering, the processing executing module 705b calls the protocol analysis module 710. The protocol analysis module 710 calculates the position in a packet from the given physical address (step S801). The protocol analysis module 710 determines whether the type of instruction is the read instruction or the write instruction (step S802). If the type is the read instruction (read at step S802), the protocol analysis module 710 takes out the packet from the read buffer (step S803) and passes the packet to the capsule module 709. The capsule module 709 removes the header for the communication with the VPN server (decapsulation) (step S804). The encryption module 708 decrypts the data (step S805). The capsule module 709 rewrites the header into that for the actual communication origin (step S806) and determines the data to be read (step S807). Thereafter, the processing ends.

If the type is the write instruction (write at step S802), the protocol analysis module 710 determines whether the data to be written is at the end of the packet (step S808). If the data is not at the end of the packet (No at step S808), the capsule module 709 stores therein the data (step S813). Thereafter, the processing ends.

If the data is at the end of the packet (Yes at step S808), the capsule module 709 rewrites the header into that for the VPN server (step S809) for performing encapsulation. The encryption module 708 encrypts the data (step S810) and the capsule module 709 adds the header for the communication with the VPN server to the encrypted data as the capsulation (step S811). The capsule module 709 actually writes the data in the transmission buffer (step S812). Thereafter, the processing ends.

Fourth Embodiment

Figure 20:
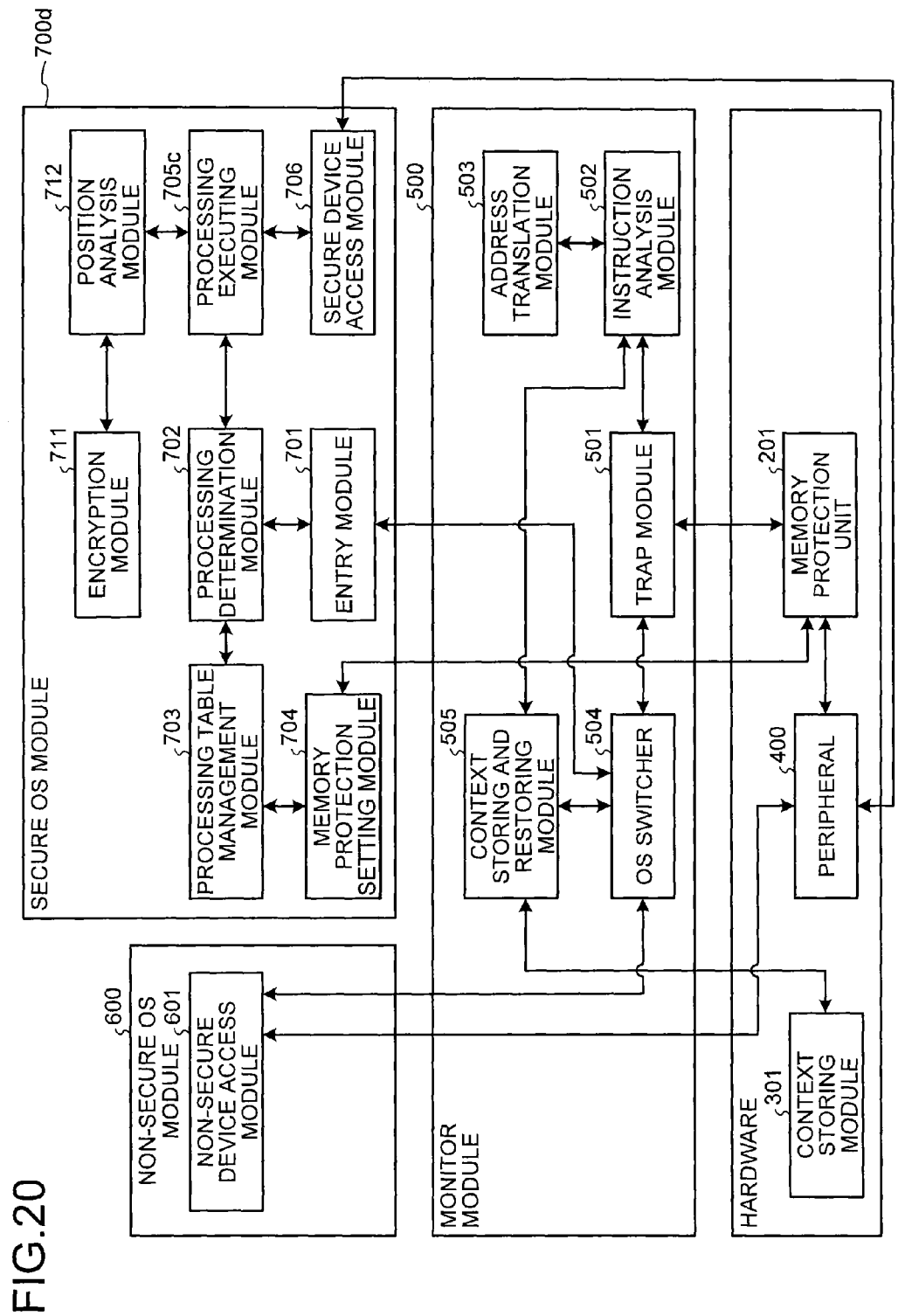
FIG. 20 is a schematic diagram illustrating the software structure of the information processing apparatus according to a fourth embodiment.

A structure that encrypts the storage is described in a fourth embodiment. FIG. 20 illustrates an example of the internal structure of the information processing apparatus 1 in the fourth embodiment. The following describes the information processing apparatus 1 in the fourth embodiment with reference to FIG. 20. The structure illustrated in FIG. 20 differs from that illustrated in FIG. 3 in that a position analysis module 712 and an encryption module 711 are included and a processing executing module 705c has a different structure from that of the processing executing module 705.

The position analysis module 712 has a function to analyze a storage access instruction when access to an instruction register for the storage is made and acquire the position of the access destination in the storage. The content of the storage access instruction is given from the processing executing module 705c as the data to be written. The position analysis module 712 further has a function to analyze the type of access instruction (read or write), and pass, to the encryption module 711, data to be encrypted or decrypted and position in the disk, and the type of processing (encryption or decryption) for decrypting the read data when the type is read instruction or for encrypting the data to be written when the type is the write instruction.

The encryption module 711 receives the position in the storage, data, and the type of processing (encryption or decryption) from the position analysis module 712, called by the position analysis module 712, and encrypts or decrypts the received data as a function thereof. Parameters used for encryption or decryption at the position in the storage may be changed.

Figures 21, 22:
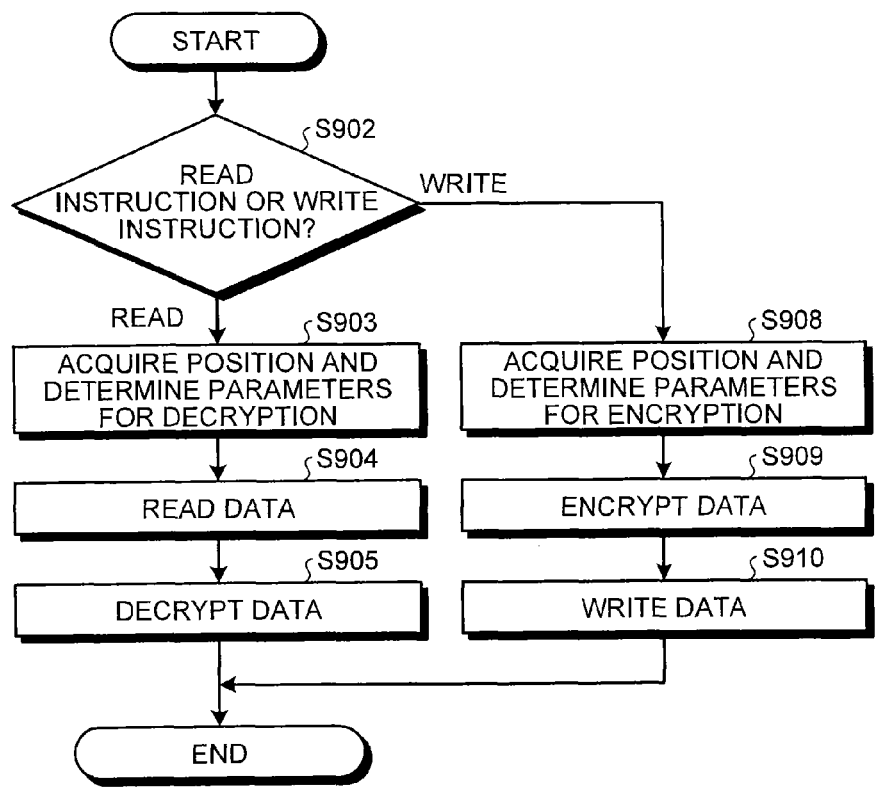
FIG. 21 is a table illustrating the filtering setting in the fourth embodiment.
FIG. 22 is a flowchart illustrating the flow of filtering in the fourth embodiment.

The processing executing module 705c has a function to request the position analysis module 712 to analyze the instruction when access to the instruction register for the storage is made. The processing executing module 705c passes the physical address of the access destination, and the data to be written to the position analysis module 712 and calls the position analysis module 712. FIG. 21 illustrates the processing table stored in the processing table management module 703. The write operation to the register storing therein the instruction to the storage is monitored.

FIG. 22 illustrates a detailed flow of the filtering in the fourth embodiment. The flowchart of FIG. 22 corresponds to the processing surrounded with the dotted line in FIG. 8, while the other processing is the same as that of FIG. 8. The position analysis module 712 determines whether the access instruction is the read instruction or the write instruction (step S902). If the access instruction is read (read at step S902), the position analysis module 712 determines the position in the storage to be accessed and the encryption module 711 determines the parameters for the decryption (step S903). The processing executing module 705c reads data through the secure device access module 706 (step S904). The data is decrypted (step S905). Thereafter, the processing ends.

If the access instruction is write (write at step S902), the position analysis module 712 determines the position in the storage to be accessed and the encryption module 711 determines the parameters for the encryption (step S908). The encryption module 711 encrypts data (step S909). The processing executing module 705c writes the data through the secure device access module 706 (step S910). Thereafter, the processing ends.

Fifth Embodiment

In the first to the fourth embodiments, the filtering such as encryption is performed using a single peripheral. There may be a case where access to a peripheral is converted into access to another peripheral of a different type. For example, when access to a local storage is converted into access to a server on a network, the non-secure OS module 600 can transparently access a storage of the server on the network by being provided with only a typical device driver that accesses the local storage. In a fifth embodiment, the storage of the server on the network can be designed, for the non-secure OS module 600, to look like the local storage. In the fifth embodiment, an example is described where the access to the storage is converted into the access to the network. The conversion is not limited to this example. Any access to a peripheral can be converted into the access to another peripheral of a different type by employing the same structure as the fifth embodiment, in which an access request to a conversion origin peripheral is analyzed and the access request is converted into an access request to a conversion destination peripheral.

Figure 23:
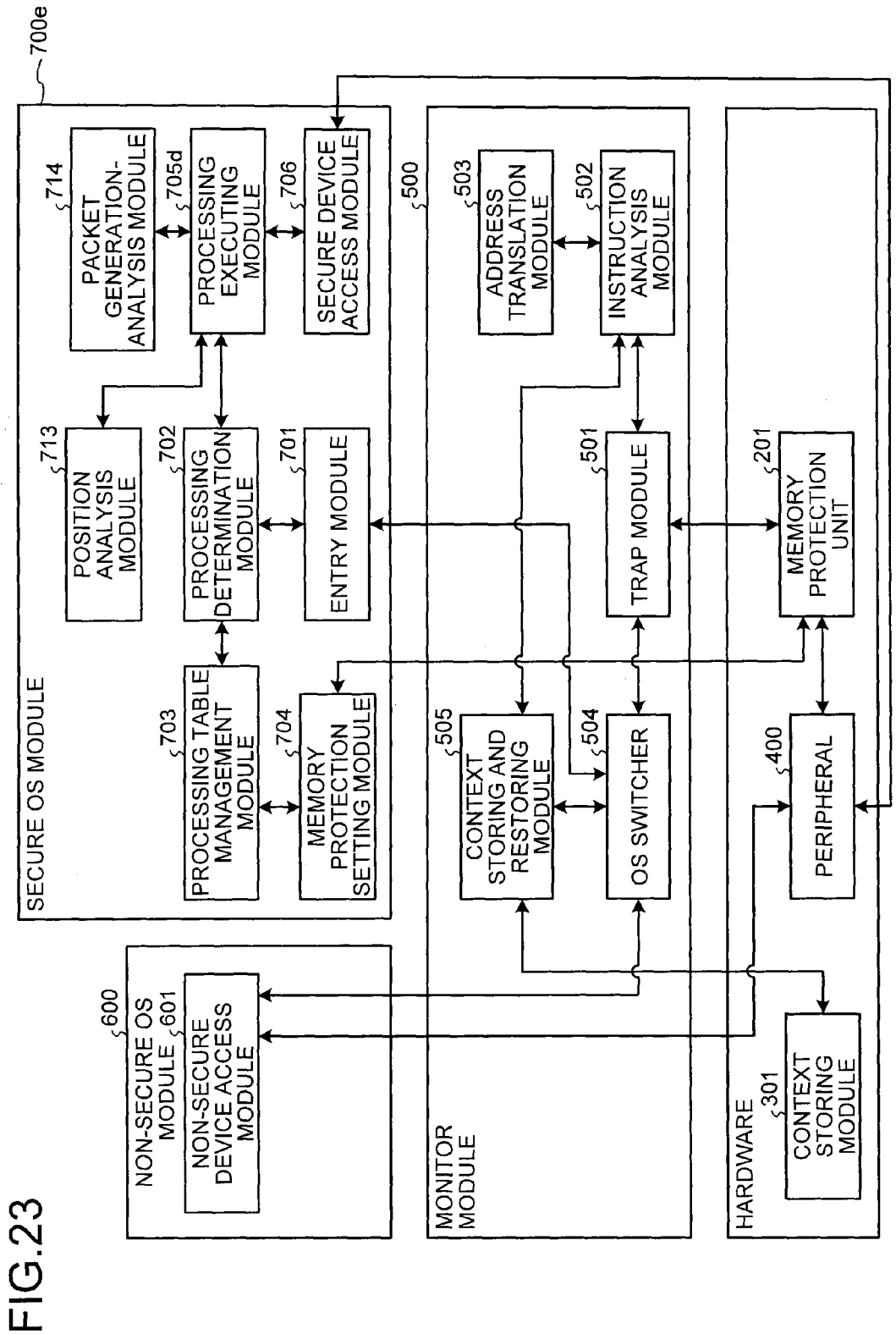
FIG. 23 is a schematic diagram illustrating the software structure of the information processing apparatus according to a fifth embodiment.

FIG. 23 illustrates an example of the internal structure of the information processing apparatus 1 according to the fifth embodiment. The following describes the fifth embodiment with reference to FIG. 23. The structure illustrated in FIG. 23 differs from that illustrated in FIG. 3 in that a packet generation-analysis module 714 and a position analysis module 713 are included. In addition, a processing executing module 705d has a different function from that of the processing executing module 705.

The position analysis module 713 is called by the processing executing module 705d when access to an instruction register for the storage is made, and analyzes a storage access instruction and acquires the position of the access destination in the storage, as a function thereof. The content of the storage access instruction is given from the processing executing module 705d as the data to be written. The position analysis module 713 has a function to analyze the type of access instruction (read or write). The position analysis module 713 returns the analyzed type of access instruction and the position in the storage to the processing executing module 705d.

The packet generation-analysis module 714 has a function to produce a packet sent to a network and analyze a packet received from the network. The packet generation-analysis module 714 receives the type of instruction when called by the processing executing module 705d. The type of instruction includes at least three types as follows: a production of a read request packet of data in the server, a production of a write request packet of data in the server, and an analysis of a reply packet for the read request received from the server. When the instruction is the production of the read request packet of data in the server, the packet generation-analysis module 714 converts the position in the storage into the location in the server at the production of the packet and produces the read request packet. The packet includes the information about the location in the server. When the instruction is the write request packet of data in the server, the packet generation-analysis module 714 produces the write request packet. The packet includes the write instruction, the information about the location in the server of the data to be written, and the data to be written. When the instruction is the analysis of the reply packet for the read request received from the server, the packet generation-analysis module 714 receives the packet and analyzes the read data in the server. The production results and the analysis result of the packets in relation to the instructions are passed to the processing executing module 705d.

The processing executing module 705d calls the position analysis module 713 when the storage access request is made, and analyzes the instruction to the storage. The processing executing module 705d receives the type of storage access instruction (read or write) and the position of data in the storage from the position analysis module 713 as the analysis results. When the type is the read request, the position analysis module 713 calls the packet generation-analysis module 714 to produce the packet for reading the data in the server. The processing executing module 705d passes the received packet to the secure device access module 706 to send the packet to the network. Thereafter, the processing executing module 705d receives, from the server, the reply packet for the read request and passes the received packet to the packet generation-analysis module 714 together with the analysis instruction. The processing executing module 705d receives the storage data from the packet generation-analysis module 714 as the analysis result and returns the data to the processing determination module 702. When the type is the write request, the processing executing module 705*d* passes the data to be written and the position information to the packet generation-analysis module 714 to produce the packet for writing the data in the server. The processing executing module 705*d* receives the packet from the packet generation-analysis module 714 as the result and passes the packet to the secure device access module 706 to send the write request to the network. As for the protocol used for the read request and the write request for data in the server, generally known protocols, such as a web-based distributed authoring and versioning (WebDAV) protocol, a file transfer protocol (FTP), and a WebSocket protocol, may be used.

Figures 24, 25:
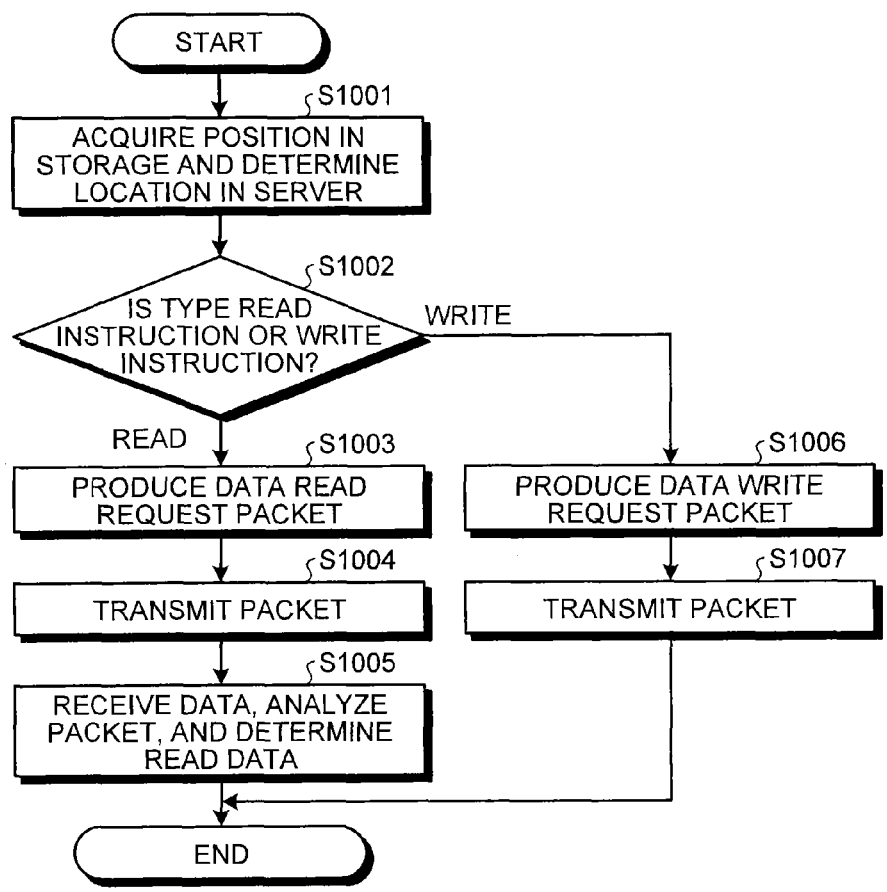
FIG. 24 is a table illustrating the filtering setting in the fifth embodiment.
FIG. 25 is a flowchart illustrating the flow of filtering in the fifth embodiment.

FIG. 24 illustrates an example of the processing table, which meets the requirement to monitor access to a register that stores therein instructions to the storage. FIG. 25 illustrates a detailed flow of the filtering in the fifth embodiment. The flowchart of FIG. 22 corresponds to the processing surrounded with the dotted line in FIG. 8, while the other processing is the same as that of FIG. 8.

The processing executing module 705*d* calls the position analysis module 713. The position analysis module 713 analyzes the instruction of the access request and acquires the type of instruction (read or write) and the location in the storage (step S1001). The location analysis module 713 determines the direction type of processing (step S1002). If the type is read (read at step S1002), the processing executing module 705*d* instructs the packet generation-analysis module 714 to produce the data read packet. The packet generation-analysis module 714 produces the data read request packet including the location in the server (step S1003). The processing executing module 705*d* receives the produced packet and sends the packet to the network through the secure device access module 706 (step S1004). The secure device access module 706 receives the read result as a reply for the sent packet. The processing executing module 705*d* calls the packet generation-analysis module 714. The packet generation-analysis module 714 analyzes the packet. The processing executing module 705*d* receives the read data (step S1005). If the type is write (write at step S1002), the processing executing module 705*d* instructs the packet generation-analysis module 714 to produce the data write packet. The packet generation-analysis module 714 produces the data write request packet including the location in the server and the data to be written (step S1006). The processing executing module 705*d* receives the produced packet and sends the packet to the network through the secure device access module 706 (step S1007).

As described above, the fifth embodiment can convert the access to a peripheral into the access to another peripheral of a different type.

Sixth Embodiment

The first embodiment aims to implement the device driver, which is the implemented form of the non-secure device access module 601 of the non-secure OS module 600, without any regard to the presence of the filtering mechanism. When the monitor module 500 and the secure OS module 700 are not included, the non-secure device access module 601 can be used as the device driver of the peripheral 400. There is an advantage that the non-secure device access module 601 of the non-secure OS module 600 can be transparently implemented, whereas there is a disadvantage that the monitor module 500 and the secure OS module 700 have enlarged functions. If the non-secure device access module 601 explicitly calls the monitor module 500 when the access to the peripheral is made, the access to the peripheral needs not to be trapped. As a result, the function of the monitor module 500 can be simplified. A sixth embodiment is an example where the non-secure device access module 601 explicitly calls the monitor module 500 and the filtering is performed. The following describes the information processing apparatus 1 in the sixth embodiment with reference to FIG. 26.

Figure 26:
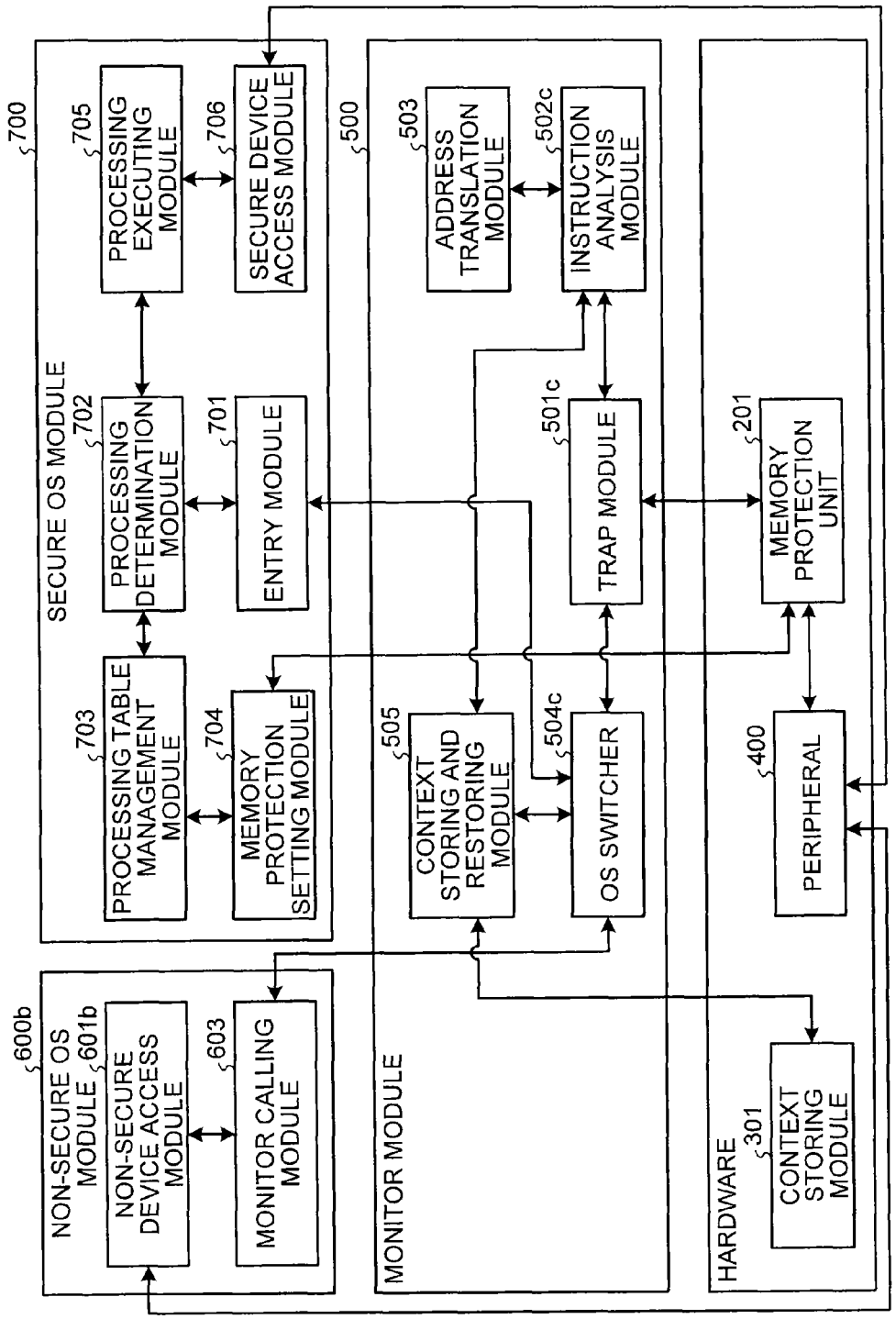
FIG. 26 is a schematic diagram illustrating the software structure of the information processing apparatus according to a sixth embodiment.

The structure of the information processing apparatus 1 in the sixth embodiment illustrated in FIG. 26 differs from that illustrated in FIG. 3 in that a non-secure OS module 600*b* includes a monitor calling module 603, and the monitor module 500 includes a non-secure device access module 601*b*, an OS switcher 504*c*, a trap module 501*c*, and an instruction analysis module 502*c* that have different functions from those of the respective modules in FIG. 3.

The monitor calling module 603 is called by the non-secure device access module 601*b* and calls the OS switcher 504*c*, as a function thereof. The monitor calling module 603 receives, from the non-secure device access module 601*b*, the virtual address of the peripheral to be accessed, the type of access (read or write), and a value to be written when the type is write. The monitor calling module 603 passes, to the OS switcher 504*c*, the virtual address of the peripheral to be accessed, the type of access (read or write), and a value to be written when the type is write. The monitor calling module 603 receives, from the OS switcher 504*c* as a result, the read value when the type is read. The monitor calling module 603 passes the value to the non-secure device access module 601*b*.

The non-secure device access module 601*b* has a function to call the monitor calling module 603 when access to the peripheral is made. The non-secure device access module 601*b* passes, to the monitor calling module 603, the virtual address of the peripheral, the type of access (read or write), and a value to be written when the type is write. The non-secure device access module 601*b* receives, from the monitor calling module 603, the read data as a result of the reading when the type is read.

In the first embodiment, the OS switcher 504*c* is called by the trap module 501*c* and the entry module 701. In the sixth embodiment, the OS switcher 504*c* is called by the entry module 701 and the monitor calling module 603. The OS switcher 504*c* receives, from the monitor calling module 603, the virtual address, the type of access (read or write), and the value to be written when the type is write, and passes them to the instruction analysis module 502*c*. The OS switcher 504*c* receives, from the instruction analysis module 502*c* as the analysis results, the physical address corresponding to the virtual address, the type of access (read or write), and the value to be written when the type is write. The OS switcher 504*c* instructs the context storing-restoring module 505 to store the context of the non-secure OS and thereafter, instructs the context storing-restoring module 505 to return the context of the secure OS. The OS switcher 504*c* then calls the entry module 701.

The trap module 501*c* has a function to return an error to the non-secure OS module 600*b* when called by the memory protection unit 201. The trap module 501*c* acquires the address of a vector table of the non-secure OS, then determines a handler that handles data abort, and jumps to the data abort handler of the non-secure OS. Because, it is not permitted that the non-secure OS module 600*b* calls directly the peripheral in the embodiment. In the embodiment, the trap module 501c jumps to the abort handler. The trap module 501c, however, may simply output an error.

The instruction analysis module 502c receives the virtual address, the type of access (read or write), and the value to be written when the type is write and passes the received virtual address of the peripheral to the address translation module 503 and instructs the address translation module 503 to convert the virtual address into the physical memory. The instruction analysis module 502c receives the physical address from the address translation module 503 as a result of the conversion and returns the physical address to the OS switcher 504c, as a function thereof.

The structures of the address translation module 503 and the secure OS module 700 are the same as those in the first embodiment.

Figure 27:
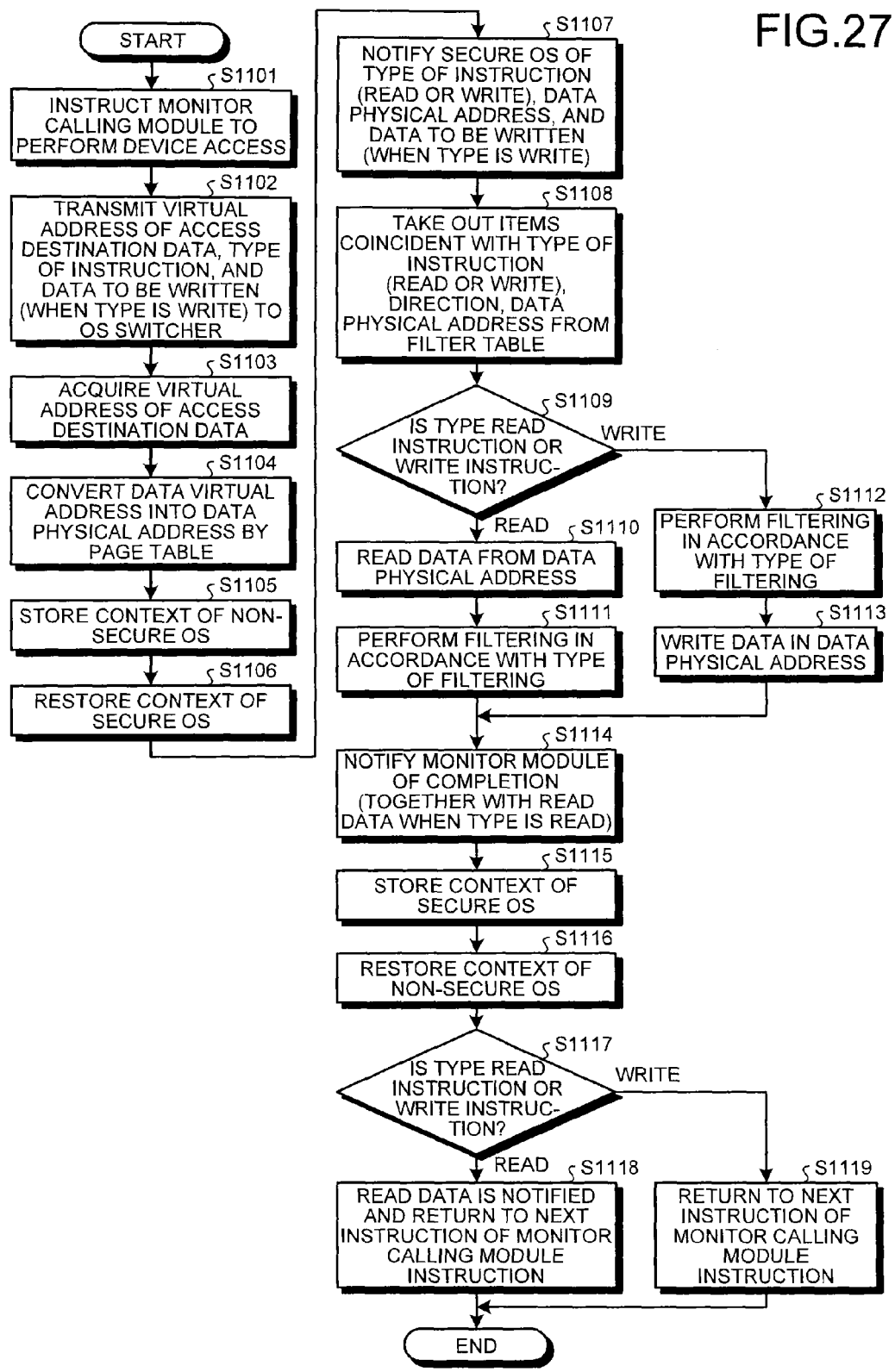
FIG. 27 is a flowchart illustrating the processing when a monitor is called in the sixth embodiment.

FIG. 27 illustrates a flowchart of the processing when the monitor is called in the sixth embodiment. When accessing the peripheral, the non-secure device access module 601 passes, to the monitor calling module, the virtual address of the data of the access destination, the type of instruction (read or write), and the data to be written when the type is write, and instructs the monitor calling module 603 to access the peripheral (step S1101). The monitor calling module 603 passes, to the OS switcher 504c, the virtual address of the data of the access destination, the type of instruction (read or write), and the data to be written when the type is write, which are received from the non-secure device access module 601, and calls the OS switcher 504c (step S1102).

The OS switcher 504c passes, to the instruction analysis module 502c, the virtual address of the data of the access destination, the type of instruction (read or write), and the data to be written when the type is write, and instructs the instruction analysis module 502c to analyze them. The instruction analysis module 502c passes the received virtual address of the data of the access destination to the address translation module 503. The address translation module 503 acquires the virtual address of the access destination (step S1103), refers to the non-secure OS page table address register, and identifies the address of the page table, and thereafter converts the virtual address into the physical address with reference to the page table (step S1104).

The OS switcher 504c calls the context storing-restoring module 505. The context storing-restoring module 505 stores the context of the non-secure OS (step S1105). Thereafter, the context storing-restoring module 505 returns the context of the secure OS (step S1106).

The OS switcher 504 passes, to the entry module 701, the physical address of the data in the access destination, the type of instruction (read or write), and the data to be written when the type is write (step S1107). The processing until the return of the context of the non-secure OS, i.e., from step S1108 to step S1116, is the same as that in the flowchart of the first embodiment. In other words, the secure OS module 700 has the same structure as that of the first embodiment. After the context of the non-secure OS is returned, the OS switcher 504 determines the type of instruction (read or write) (step S1117) and if the type is the write instruction (write at step S1117), a return is made to the next instruction of the monitor call instruction of the monitor calling module 603 (step S1119). Thereafter, the processing ends. If the type is the read instruction (read at step S1117), the read data is passed to the monitor calling module 603. A return is made to the next instruction of the monitor call instruction (step S1118). Thereafter, the processing ends.

Figure 28:
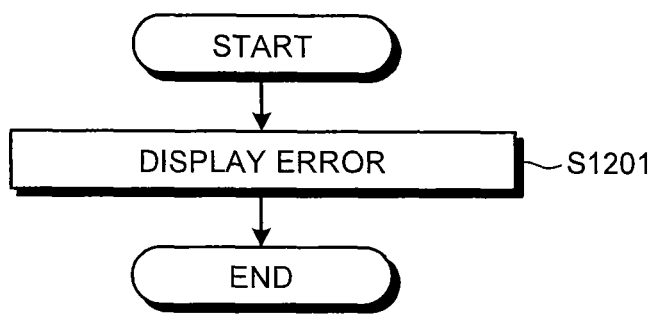
FIG. 28 is a flowchart illustrating the processing when an abort occurs in the sixth embodiment.
Figure 29:
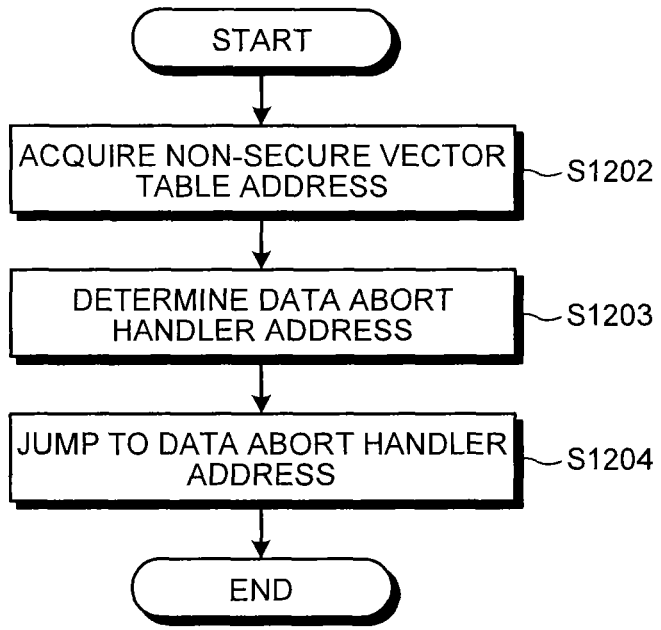
FIG. 29 is a flowchart illustrating the processing when an abort occurs in a modification of the sixth embodiment.

FIG. 28 illustrates a flow chart of the processing when an abort occurs in the sixth embodiment. When access is made to the peripheral to which access is prohibited, the memory protection unit 201 calls the trap module 501c. The trap module 501c displays an error (step S1201). Thereafter, the processing ends. FIG. 29 illustrates a modification of the processing when an abort occurs. In the modification, the trap module 501c does not only display an error but jumps to the abort handler of the non-secure OS module 600b. The trap module 501c acquires the non-secure vector table address (step S1202) and then determines the address of the data abort handler (step S1203). The trap module 501c jumps to the acquired address and calls the data abort handler (step S1204).

In the sixth embodiment, the address translation module 503 of the monitor module 500 converts the virtual address into the physical address. The conversion may be done by the monitor calling module 603 of the non-secure OS module 600b. In this case, the address translation module 503 is not indispensable. As described above, because the non-secure device access module 601b explicitly calls the monitor module 500 when access to the peripheral is made, the access to the peripheral needs not to be trapped, which makes it possible to simplify the function of the monitor module 500.

The program including the secure OS module, the non-secure module, and the monitor module may be provided as a computer program product such as a computer readable medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a memory; and
a processor configured to selectively switch between a secure mode and a non-secure mode, set independent access rights for the respective modes to the memory, and perform certain data processing in the selected mode, wherein
the memory stores instructions that when executed by the processor perform operations, comprising:
a secure operating system (OS) configured to run in the secure mode;
a non-secure OS configured to run in the non-secure mode; and
a monitor configured to switch between the secure OS and the non-secure OS, wherein
the secure OS includes
a processing table management controller configured to store therein a physical address of data to be accessed in the memory and an access type in association with each other for each certain data processing, the access type being read access or write access;
a memory protection setting controller configured to refer to the processing table management controller, and set a protection address in the memory for each certain data processing, at least one of the read access and the write access by the non-secure OS being prohibited;

a processing determination controller configured to receive the access type and a physical address of an access destination, further receive data to be written when the access type is the write access, acquire a list of processing from the processing table management controller, and determine a type of processing to be performed;

a processing executing controller configured to receive, from the processing determination controller, the type of processing, the access type, and the physical address of the access destination, further receive, from the processing determination controller, the data to be written when the access type is the write access, acquire data from a secure device access controller when the access type is the read access, and perform the certain data processing on the data;

the secure device access controller configured to receive the access type and the physical address of an access destination, further receive data to be written when the access type is the write access, and access a peripheral identified by the physical address; and an entry controller configured to receive, from an OS switcher of the monitor, the access type and a physical address of an access destination, further receive, from the OS switcher, data to be written when the access type is the write access, call the processing determination controller, acquire read data from the processing determination controller when the access type is the read access, and call the OS switcher, and the monitor includes the OS switcher configured to control switching between the secure OS and the non-secure OS;

an instruction analysis controller configured to acquire an instruction implementation of which is rejected, determine the access type, acquire a virtual address of a read destination when the access type is the read access, and acquire data to be written when the access type is the write access; and an address translation controller configured to translate the virtual address into the physical address by a page table of the non-secure OS.

2. The apparatus according to claim 1, wherein the monitor includes, a processing setting controller configured to update a setting of the certain data processing stored in the processing table management controller; and an event detection controller configured to detect a certain event, and instruct the processing setting controller to change the setting of the certain data processing when detecting the certain event.

3. The apparatus according to claim 1, wherein the processor includes:

an interrupt controller configured to suspend running processing in response to an interrupt request to the peripheral;

the monitor includes, a trap controller configured to be called by the interrupt controller when the running processing is suspended, store therein an executing state of the suspended running processing, and call the OS switcher; and the secure OS includes, a secure interrupt handler configured to be called when the OS is switched, call the processing determination controller, and call the OS switcher after completion of the interrupt request, wherein the processing determination controller is configured to acquire processing coincident with the certain data processing designated by the interrupt request from the processing table management controller, and pass the coincident processing to the processing executing controller, and the processing executing controller is configured to perform the coincident processing, and thereafter call the secure interrupt handler.

4. The apparatus according to claim 1, wherein the secure OS includes, a protocol analysis controller configured to calculate a position in a packet from the physical address of the peripheral serving as the access destination; and a capsule controller configured to be called by the protocol analysis controller, encapsulate data, and decapsulate encapsulated data, wherein the processing executing controller is configured to pass, to the protocol analysis controller, the physical address of the access destination and the access type, further pass, to the protocol analysis controller, data to be written when the type is the write access, and request the protocol analysis controller to transmit and receive the packet.

5. The apparatus according to claim 1, wherein the secure OS includes, a position analysis controller configured to analyze a storage access instruction when access to an instruction register for a storage is made, and acquire a position of the access destination in the storage;

an encryption controller configured to be called by the position analysis controller by receiving the position in the storage, data, and type of processing, the type of processing being encryption or decryption, from the position analysis controller, and encrypt or decrypt the received data, wherein the processing executing controller is configured to request the position analysis controller to analyze the instruction when the access to the instruction register for the storage is made.

6. The apparatus according to claim 1, wherein the secure OS includes, a position analysis controller configured to be called by the processing executing controller when access to an instruction register for a storage is made, analyze a storage access instruction, and acquire a position of the access destination in the storage; and a packet generation-analysis controller configured to receive a type of instruction when called by the processing executing controller, produce a packet sent to a network in accordance with the type of instruction, and analyze the packet received from the network.

7. A computer program product comprising a non-transitory computer-readable medium containing a computer program executed by a computer that includes a processor configured to selectively switch between a secure mode and a non-secure mode, set independent access rights for the respective modes to a memory, and perform certain data processing in the selected mode, the computer program causing the computer to include:

a secure operating system (OS) configured to run in the secure mode;

a non-secure OS configured to run in the non-secure mode; and a monitor configured to switch between the secure OS and the non-secure OS, wherein the secure OS includes a processing table management controller configured to store therein a physical address of data to be accessed in the memory and an access type in association with each other for each certain data processing, the access type being read access or write access;
a memory protection setting controller configured to refer to the processing table management controller, and set a protection address in the main memory for each certain data processing, at least one of the read access and the write access to the protection address by the non-secure OS being prohibited;
a processing determination controller configured to receive the access type and a physical address of an access destination, further receive data to be written when the access type is the write access, acquire a list of processing from the processing table management controller, and determine a type of processing to be performed;
a processing executing controller configured to receive, from the processing determination controller, the type of processing, the access type, and the physical address of the access destination, further receive, from the processing determination controller, the data to be written when the access type is the write access, acquire data from a secure device access controller when the access type is the read access, and perform the certain data processing on the data;

the secure device access controller configured to receive the access type and the physical address of an access destination, further receive data to be written when the access type is the write access, and access a peripheral identified by the physical address; and
an entry controller configured to receive, from an OS switcher of the monitor, the access type and a physical address of an access destination, further receive, from the OS switcher, data to be written when the access type is the write access, call the processing determination controller, acquire read data from the processing determination controller when the access type is the read access, and call the OS switcher, and the monitor includes
the OS switcher configured to control switching between the secure OS and the non-secure OS;
an instruction analysis controller configured to acquire an instruction implementation of which is rejected, determine the access type, acquire a virtual address of a read destination when the access type is the read access, and acquire data to be written when the access type is the write access; and
an address translation controller configured to translate the virtual address into the physical address by a page table of the non-secure OS.

* * * * *